(12) United States Patent
Takahashi et al.

(10) Patent No.: US 9,880,454 B2
(45) Date of Patent: Jan. 30, 2018

(54) LIGHT SOURCE DEVICE AND PROJECTOR USING THE SAME

(71) Applicants: Tatsuya Takahashi, Tokyo (JP);
Kazuhiro Fujita, Tokyo (JP);
Toshiharu Murai, Kanagawa (JP);
Takehiro Nishimori, Kanagawa (JP)

(72) Inventors: Tatsuya Takahashi, Tokyo (JP);
Kazuhiro Fujita, Tokyo (JP);
Toshiharu Murai, Kanagawa (JP);
Takehiro Nishimori, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 23 days.

(21) Appl. No.: 15/021,129

(22) PCT Filed: Oct. 23, 2014

(86) PCT No.: PCT/JP2014/078838
§ 371 (c)(1),
(2) Date: Mar. 10, 2016

(87) PCT Pub. No.: WO2015/064669
PCT Pub. Date: May 7, 2015

(65) Prior Publication Data
US 2016/0223892 A1 Aug. 4, 2016

(30) Foreign Application Priority Data
Nov. 1, 2013 (JP) .................................. 2013-228666
Sep. 5, 2014 (JP) .................................. 2014-180924

(51) Int. Cl.
*G03B 21/20* (2006.01)
*H04N 9/31* (2006.01)
(Continued)

(52) U.S. Cl.
CPC .............. *G03B 21/204* (2013.01); *F21V 7/00* (2013.01); *F21V 9/10* (2013.01); *F21V 9/16* (2013.01);
(Continued)

(58) Field of Classification Search
None
See application file for complete search history.

(56) References Cited

U.S. PATENT DOCUMENTS

2010/0328554 A1  12/2010  Shibasaki
2012/0019791 A1   1/2012  Abe et al.
(Continued)

FOREIGN PATENT DOCUMENTS

CN  103019017 A  4/2013
CN  103091958 A  5/2013
(Continued)

OTHER PUBLICATIONS

Chinese Office Action and English translation thereof dated Jan. 25, 2017.
(Continued)

*Primary Examiner* — Kristy A Haupt
(74) *Attorney, Agent, or Firm* — Harness, Dickey & Pierce, P.L.C.

(57) ABSTRACT

A light source device is disclosed. An embodiment of the light source device includes: an excitation light source configured to emit irradiation light of a color component to be used as excitation light and projection light; a fluorescent member disposed in an excitation light path and configured to generate fluorescence of a color component different from the color component of the irradiation light when being irradiated with the irradiation light; a light path merger unit configured to merge a fluorescence light path through which the fluorescence generated with irradiation of the irradiation (Continued)

light is delivered, and a projection light path through which the projection light is delivered; and a light path switch disk configured to switch the irradiation light between the excitation light path and the projection light path.

16 Claims, 21 Drawing Sheets

(51) Int. Cl.
*G03B 33/08* (2006.01)
*F21V 7/00* (2006.01)
*F21V 9/10* (2006.01)
*F21V 9/16* (2006.01)
*F21V 14/04* (2006.01)
*F21V 14/08* (2006.01)
*G03B 21/00* (2006.01)
*F21Y 101/00* (2016.01)

(52) U.S. Cl.
CPC .............. *F21V 14/04* (2013.01); *F21V 14/08* (2013.01); *G03B 21/008* (2013.01); *G03B 21/206* (2013.01); *G03B 33/08* (2013.01); *H04N 9/3111* (2013.01); *F21Y 2101/00* (2013.01); *G03B 21/2066* (2013.01)

(56) References Cited

U.S. PATENT DOCUMENTS

| | | |
|---|---|---|
| 2012/0092628 A1 | 4/2012 | Takahashi et al. |
| 2012/0236266 A1 | 9/2012 | Takahashi et al. |
| 2013/0010264 A1* | 1/2013 | Takahashi ............ H04N 9/3114 353/20 |
| 2013/0021582 A1 | 1/2013 | Fujita et al. |
| 2013/0070333 A1 | 3/2013 | Takahashi et al. |
| 2013/0077056 A1 | 3/2013 | Okuda |
| 2013/0088690 A1 | 4/2013 | Wang |
| 2013/0100420 A1 | 4/2013 | Ferri et al. |
| 2013/0100421 A1 | 4/2013 | Hsu et al. |
| 2013/0100423 A1 | 4/2013 | Yamagishi et al. |
| 2013/0107230 A1 | 5/2013 | Mural |
| 2013/0308104 A1 | 11/2013 | Nishimori et al. |
| 2014/0028983 A1 | 1/2014 | Fujita et al. |
| 2014/0036241 A1 | 2/2014 | Nishimori et al. |
| 2014/0049755 A1 | 2/2014 | Nishimori et al. |
| 2014/0071182 A1 | 3/2014 | Takahashi et al. |
| 2014/0071407 A1 | 3/2014 | Takahashi et al. |
| 2014/0071408 A1 | 3/2014 | Takahashi et al. |
| 2014/0240679 A1 | 8/2014 | Nishimori et al. |
| 2014/0240680 A1 | 8/2014 | Nishimori et al. |
| 2014/0268068 A1 | 9/2014 | Takahashi et al. |
| 2014/0268069 A1 | 9/2014 | Takahashi et al. |
| 2014/0268072 A1 | 9/2014 | Takahashi et al. |

FOREIGN PATENT DOCUMENTS

| | | |
|---|---|---|
| EP | 2939070 | 11/2015 |
| JP | 2011-28244 | 2/2011 |
| JP | 2012-53162 | 3/2012 |
| JP | 2012-150212 A | 8/2012 |
| JP | 2013-76968 | 4/2013 |
| JP | 2013-101317 | 5/2013 |
| WO | WO-2014104385 A1 | 7/2014 |

OTHER PUBLICATIONS

International Search Report dated Feb. 3, 2015 in PCT/JP2014/078838 filed on Oct. 23, 2014.
Extended European Search Report dated Dec. 6, 2016.

* cited by examiner

R

G

Y

| lm/W | R | G | B | Y |
|---|---|---|---|---|
| FIG.15 | 245 | 591 | 50 | 445 |
| FIG.16 | 236 | 564 | 96 | 437 |

LIGHT SOURCE DEVICE AND PROJECTOR USING THE SAME

TECHNICAL FIELD

The present invention relates to improvement in a light source device and a projector using the same, the light source device being for use to form a color image on a screen by means of an image formation element (image formation unit) by irradiating the image formation element with light of a blue component, light of a red component and light of a green component (light of different color components) in a time-dividing manner.

BACKGROUND ART

Heretofore, there has been known a projector that forms a color image on a screen by means of an image formation element by projecting light of a blue component, light of a red component and light of a green component onto the image formation element in a time-dividing manner (see, JP2013-101317A, for example).

The projector disclosed in JP2013-101317A includes a laser light source configured to emit blue light, a fluorescent member configured to generate fluorescence by being excited by the blue light, and a rotary reflective member (rotary wheel) disposed oblique to a light path of the laser light source. The rotary reflective member is provided with a first area configured to reflect light and a second area configured not to reflect light.

With this configuration, even when the laser light source emits laser light with high energy, the fluorescent member is irradiated with the laser light while the light paths are switched by the rotary reflective member, and thereby heat generation of optical constituents such as the fluorescent member can be reduced.

SUMMARY OF THE INVENTION

Projection light projected on a screen has such an inconvenient feature that the color of the projection light is not adjustable because the color is determined by the spectral characteristics of the light source and the spectral characteristics of the fluorescence.

Human eyes have low visual sensitivity to blue light, in particular. For this reason, if blue laser light is used as excitation light for a fluorescent member and is also used as projection light on a screen, it is a drawback that the color image formed on the screen looks dark.

The present invention has been made in view of the foregoing circumstances, and has an objective to provide a light source device and a projector using the same, the light source device being capable of adjusting a color reproduction range.

A light source device according to the present invention includes: an excitation light source configured to emit irradiation light of a color component to be used as excitation light and projection light; a fluorescent member disposed in an excitation light path and configured to generate fluorescence when being irradiated with the irradiation light, the fluorescence having a color component different from the color component of the irradiation light; a light path merger unit configured to merge a fluorescence light path through which the fluorescence generated with irradiation of the irradiation light is delivered and a projection light path through which the irradiation light is delivered as the projection light; and a light path switch member configured to switch the irradiation light between the excitation light path and the projection light path. The light path switch member includes at least a first reflective-transmissive area and a second reflective-transmissive area, the first reflective-transmissive area has a reflectance index or a transmittance index of delivering part of the irradiation light to the projection light path and delivering the rest of the irradiation light to the excitation light path, the second reflective-transmissive area has a reflectance index or a transmittance index of delivering part of the irradiation light to the excitation light path and delivering the rest of the irradiation light to the projection light path, and the reflectance indexes of the first reflective-transmissive area and the second reflective-transmissive area, or the transmittance indexes of the first reflective-transmissive area and the second reflective-transmissive area are different from each other.

In the present invention, the first reflective-transmissive area and the second reflective-transmissive area are formed in the light path switch member, and are set to have the different reflectance indexes or transmittance indexes. Thus, the first reflective-transmissive area and the second reflective-transmissive area transmit and reflect different light quantities of the irradiation light from the excitation light source, so that the projection light and the fluorescence of the color components different from each other can be mixed with each other. Thus, an effect of enabling adjustment of a color reproduction range can be produced.

BRIEF DESCRIPTION OF DRAWINGS

FIG. 14A presents an intensity distribution of a spectrum of color component R on a screen. FIG. 14B presents an intensity distribution of a spectrum of color component G on the screen. FIG. 14C presents an intensity distribution of a spectrum of color component Y on the screen.

DESCRIPTION OF THE EMBODIMENTS

Embodiment 1

Figure 1:
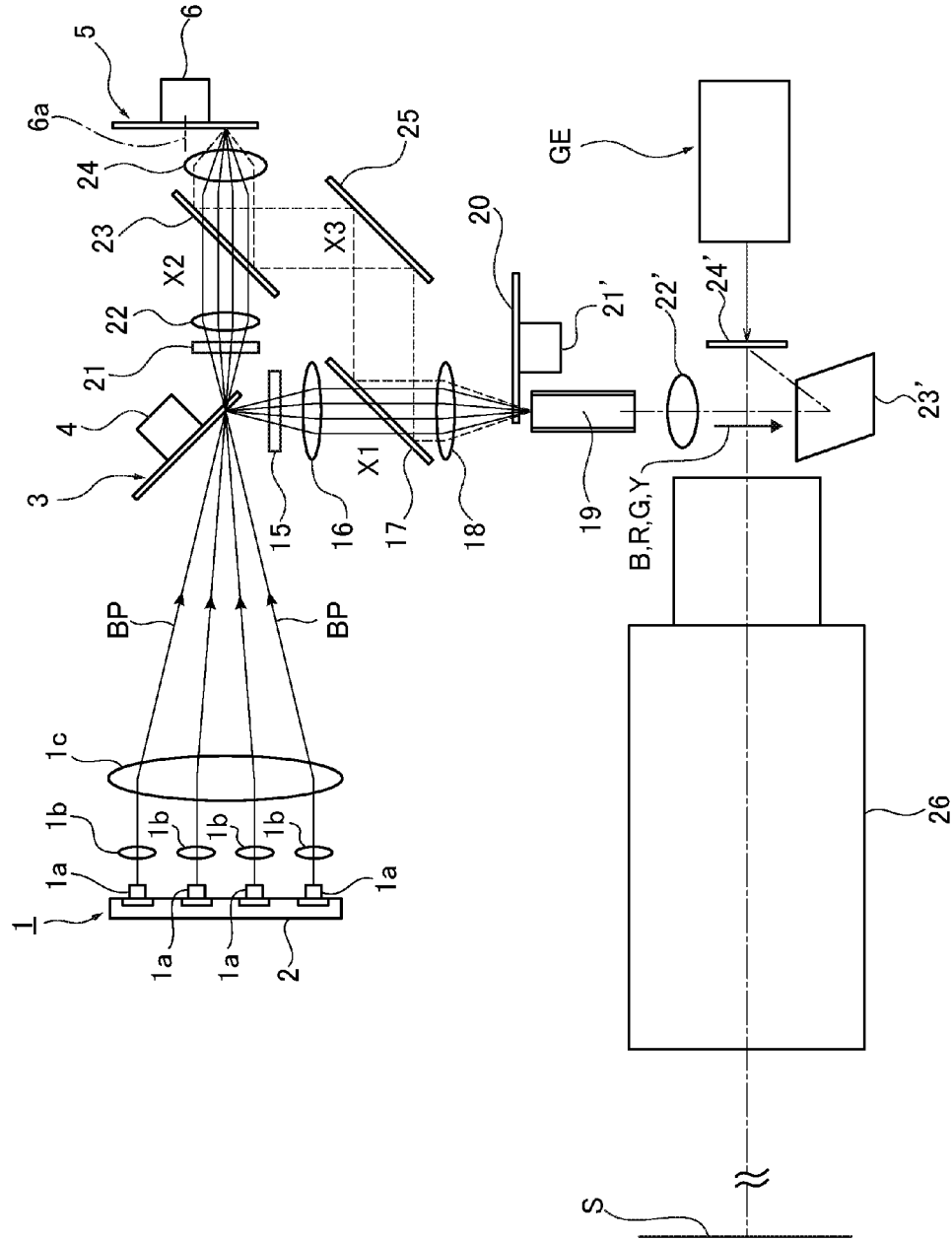
FIG. 1 is an optical diagram illustrating main constituents in an optical system for a projector according to Embodiment 1 of the present invention.

FIG. 1 is an optical diagram illustrating main constituents of an optical system of a projector including a light source device according to Embodiment 1 of the present invention. In FIG. 1, reference numeral 1 indicates a light source unit. The light source unit 1 mainly includes laser diodes (LD) 1a, coupling lenses 1b and a condensing lens 1c.

Multiple laser diodes 1a are provided on a drive circuit board 2. The laser diodes 1a are each provided with one coupling lens 1b.

Laser light from the laser diodes 1a is condensed by the coupling lenses 1b and is delivered as collimated light to the condensing lens 1c.

The condensing lens 1c has a function to condense the laser light collimated by the coupling lenses 1b.

Here, description is provided for the case where the laser diodes 1a emit laser light BP of a blue component as irradiation light among light of a blue component, light of a red component and light of a green component.

However, laser diodes (LD) to emit laser light of the green component or laser light of the red component can be used instead. Alternatively, light emission diodes (LED) may be used in place of the laser diodes (LD).

The laser diodes 1a are used as an excitation light source to excite a fluorescent member to be described later, and also function as a light source to emit irradiation light of a color component to be used as projection light on a screen to be described later.

A light path switch disk 3 is provided on a light path through which the laser light BP of a blue component emitted from the light source unit 1 travels. This light path switch disk 3 is driven to rotate by a stepping motor 4 as a drive source, for example, as illustrated in FIG. 1.

Figure 2:
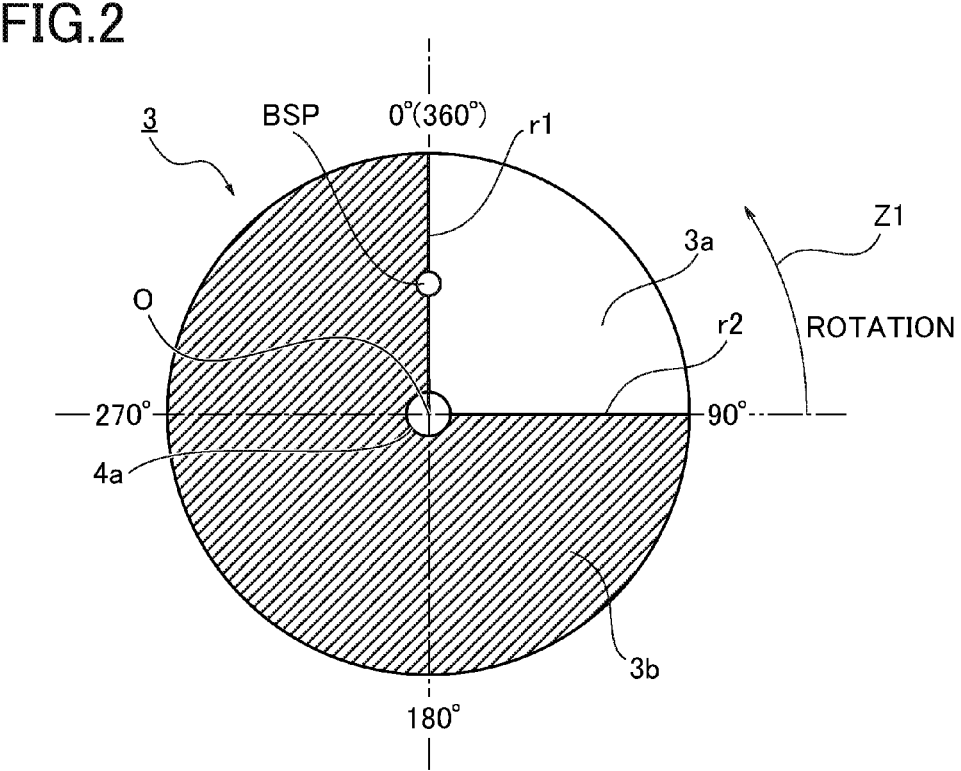
FIG. 2 is a plan view of a light path switch disk as a light path switch member illustrated in FIG. 1.

As illustrated in FIG. 2, the light path switch disk 3 includes a first reflective-transmissive area 3a and a second reflective-transmissive area 3b divided in a rotational direction. Reference numerals r1, r2 indicate border regions between the first reflective-transmissive area 3a and the second reflective-transmissive area 3b, reference numeral r1 indicates a forward-side border region in a rotational direction Z1 of the light path switch disk 3, and reference numeral r2 indicates a backward-side border region in the rotational direction Z1.

This light path switch disk 3 is disposed oblique to an optical axis of the condensing lens 1c (here at 45 degrees to the optical axis). Here, reference numeral 4a indicates a rotational axis of the light path switch disk 3.

The light path switch disk 3 has a function as a light path switch member to switch a light path between an excitation light path X2 for delivering the laser light BP as excitation light to a fluorescent member 5, and a projection light path X1 for delivering the laser light BP as projection light. Incidentally, in Embodiment 1, the description is provided for the light path switch member to be driven to rotate, but the light path switch member may be configured to reciprocate. The same also applies to the fluorescent member to be described layer.

The fluorescent member 5 is formed of a rotary disk, and is driven to rotate by a stepping motor 6 as a drive source. Reference numeral 6a indicates a rotational axis of the fluorescent member 5. The fluorescent member 5 uses a reflective disk as the rotary disk. A fluorescent material to generate fluorescence having at least two color components by receiving the laser light BP is applied to the reflective disk.

The rotationally-driven configuration of the fluorescent member 5 keeps a certain single portion of the fluorescent member 5 from being irradiated with the laser light BP for a long time in a concentrated manner, and thereby prevents deterioration of the fluorescent material of the fluorescent member 5.

As the fluorescent material, here used is a material to generate fluorescence having the red component R and the green component G which are the remaining color components different from the color component (blue component B) of the laser light BP, or for example, a material to generate fluorescence having a yellow component Y.

To be more specific, the material used as the fluorescent material generates fluorescence whose wavelength $\lambda$ is in a wavelength band of 580 nm<$\lambda$<750 nm (red component R) and generates fluorescence whose wavelength $\lambda$ is in a wavelength band of 450 nm<$\lambda$<600 nm (green component G) (the fluorescent material which generates fluorescence having a wavelength distribution of 450 nm to 750 nm).

The first reflective-transmissive area 3a has a reflectance index for delivering a majority of irradiation light (laser light BP) to the projection light path X1 and a transmittance index for delivering the rest of the irradiation light (laser light BP) to the excitation light path X2.

The second reflective-transmissive area 3b has a transmittance index for delivering a majority of the irradiation light (laser light BP) to the excitation light path X2 and a reflectance index for delivering the rest of the irradiation light (laser light BP) to the projection light path X1.

For example, the first reflective-transmissive area 3a has a reflectance index of about 99% to 97% and a transmittance index of about 1% to 3%. The second reflective-transmissive area 3b has a transmittance index of about 99% to 97% and a reflectance index of about 1% to 3%.

In this way, the reflectance index of the first reflective-transmissive area 3a and the reflectance index of the second reflective-transmissive area 3b, or the transmittance index of the first reflective-transmissive area 3a and the transmittance index of the second reflective-transmissive area 3b are different from each other.

The laser light BP is focused onto a substantially single point by the condensing lens 1c, and thereby forms a focused spot BSP on the light path switch disk 3 as illustrated in FIG. 2. The following description is provided based on the definition that the light path switch disk 3 is located at a rotation angle $\theta$=0 degrees (360 degrees) when the focused spot BSP is located on the border region r1.

When the focused spot BSP falls on the first reflective-transmissive area 3a, a majority of the laser light BP forming the focused spot BSP is delivered to the projection light path X1 and the rest of the laser light BP forming the focused spot BSP is mainly delivered to the excitation light path X2.

The projection light path X1 is provided with a first diffuser plate 15, a condensing lens 16, a dichroic mirror 17, a condensing lens 18 and a light tunnel 19 in this order. A color component switch disk 20 is provided between the light tunnel 19 and the condensing lens 18.

The first diffuser plate 15 takes a role of eliminating a speckle pattern of laser light BP and also takes a role of reducing light quantity unevenness of the laser light BP to enhance the evenness of the light quantity distribution.

The laser light BP passed through the first diffuser plate 15 is collimated by the condensing lens 16, and is delivered to the dichroic mirror 17. The dichroic mirror 17 has functions to transmit the laser light BP and to reflect the fluorescence of red component R and the fluorescence of green component G.

The excitation light path X2 is provided with a second diffuser plate 21, a condensing lens 22, a dichroic mirror 23, and a condensing lens 24. The second diffuser plate 21 is provided at a conjugated position of the first diffuser plate 15 with respect to the light path switch disk 3, and has the same functions as the first diffuser plate 15.

The laser light BP passed through the second diffuser plate 21 is collimated as excitation light by the condensing lens 22 and is delivered to the dichroic mirror 23. The dichroic mirror 23 has functions to transmit the laser light BP and to reflect the fluorescence of red component R and the fluorescence of green component G.

The collimated light passed through the dichroic mirror 23 is focused by the condensing lens 24 and is applied to the fluorescent member 5. By receiving the laser light BP as the excitation light, the fluorescent member 5 generates fluorescence of yellow component Y which is a mixture of the fluorescence of red component R and the fluorescence of green component G.

This fluorescence of yellow component Y is condensed and collimated by the condensing lens 24, and is delivered to the dichroic mirror 23. Then, the fluorescence is reflected by the dichroic mirror 23 to a reflecting mirror 25.

The reflecting mirror 25 reflects the fluorescence of yellow component Y to the dichroic mirror 17. The reflecting mirror 25 and the dichroic mirror 23 constitute a fluorescence light path X3. The dichroic mirrors 17, 23 and the reflecting mirror 25 function as a light path merger unit to merge the projection light path X1 and the fluorescence light path X3.

The laser light BP passed through the dichroic mirror 17 or the fluorescence of yellow component Y reflected by the dichroic mirror 17 is condensed by the condensing lens 18 and is delivered to the color component switch disk 20.

This color component switch disk 20 is driven to rotate by a stepping motor 21'. Incidentally, the color component switch disk 20 may be also configured to reciprocate as similar to the light path switch disk 3.

Figure 3:
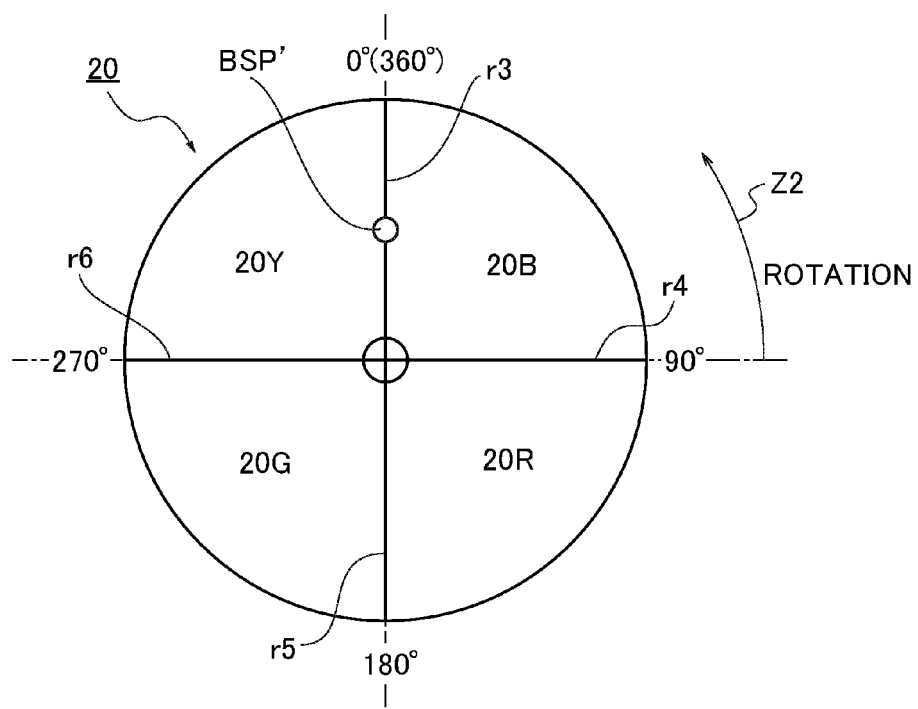
FIG. 3 is a plan view of a color component switch disk as a color component switch member illustrated in FIG. 1.

As illustrated in FIG. 3, the color component switch disk 20 includes: a sector-shaped transmissive area 20B to transmit the laser light BP of blue component B and the fluorescence of yellow component Y; a sector-shaped transmissive area 20R to transmit the fluorescence of red component R and the laser light BP of blue component B and to prohibit transmission of the fluorescence of green component G; a sector-shaped transmissive area 20G to transmit the fluorescence of green component G and the laser light BP of blue component B and to prohibit transmission of the fluorescence of red component R; and a sector-shaped transmissive area 20Y to transmit the fluorescence of yellow component Y and the laser light BP of blue component B.

The transmissive area 20R is formed of a filter to transmit laser light BP with a wavelength of 450 nm<$\lambda$<495 nm and fluorescence with a wavelength of 580 nm<$\lambda$<750 nm and to reflect light with the other wavelengths, for example. By changing the wavelength transmittance characteristics of the transmissive area 20R, the color of the light of red component R can be changed, and thereby the color reproduction range can be adjusted.

The transmissive area 20G is formed of a filter to transmit fluorescence with a wavelength of 450 nm<$\lambda$<600 nm and to reflect light with the other wavelengths, for example. By changing the wavelength transmittance characteristics of the transmissive area 20G, the color of the light of green component G can be changed, and thereby the color reproduction range can be adjusted as well.

Each of the transmissive areas 20B and 20Y may be formed of a sector-shaped transparent body or a sector-shaped cutout. Instead of a completely transparent body, a filter to only transmit laser light BP with a particular wavelength in the laser light BP of blue component B may be used to form the transmissive area 20B. With this configuration, the transmissive area 20B can be configured to change the color of the laser light BP of blue component B. The transmissive area 20Y may be similarly formed of a filter, and thereby be configured to change the color of yellow component Y.

In FIG. 3, reference numeral r3 indicates a border region between the transmissive area 20Y and the transmissive area 20B; r4, a border region between the transmissive area 20B and the transmissive area 20R; r5, a border region between the transmissive area 20R and the transmissive area 20G; r6, a border region between the transmissive area 20G and the transmissive area 20Y; Z2, a rotational direction of the color component switch disk 20; and BSP', a focused spot formed by the condensing lens 18. Here, it is defined that the color component switch disk 20 is located at a rotation angle $\theta$=0 degrees (360 degrees) when the focused spot BSP' is located on the border region r3.

The color component switch disk 20 is rotated synchronously with the light path switch disk 3, and is rotated by one revolution during one revolution of the light path switch disk 3 to switch light of color components delivered to a light tunnel 19 at regular intervals.

As illustrated in FIG. 1, the light passed through each area of the color component switch disk 20 is delivered as the projection light of color components B, R, G, and Y to the light tunnel 19 serving as a light quantity unevenness preventive member. Incidentally, a fly-eye lens may be used in place of the light tunnel 19.

The projection light of color components B, R, G, and Y passed through the light tunnel 19 is collimated by a condensing lens 22' and delivered to a reflecting mirror 23'. Then, the projection light is reflected and delivered by the reflecting mirror 23' to an image formation panel (DMD) 24'. The image formation panel 24' is controlled by a well-known image formation unit GE. The projection light of color components B, R, G, and Y reflected by the image formation panel 24' is magnified and projected on a screen S by a projection optical system 26.

The image formation panel 24' has a function to form an image on the screen S by forming projection light to the screen S by being irradiated with the fluorescence excited by the excitation light and having the color component different from the color component of the irradiation light, and by forming projection light to the screen S by being irradiated with the laser light BP as the irradiation light. In Embodiment 1, while the light path switch disk 3 makes one revolution, the projection light of color components B, R, G, and Y is projected on the screen S as illustrated in a timing chart of FIG. 4.

When the focused spot BSP falls on the first reflective-transmissive area 3*a* of the light path switch disk 3, the laser light BP forming the focused spot BSP is reflected in a light quantity of about 97%, and is transmitted in a light quantity of about 3%. Thus, when the rotation angle θ is within a range from the border region r1 to the border region r2, a majority of the laser light BP is delivered to the projection light path X1 and the rest of the laser light BP is delivered to the excitation light path X2.

The border region r3 of the color component switch disk 20 corresponds to the border region r1 of the light path switch disk 3, and the border region r4 of the color component switch disk 20 corresponds to the border region r2 of the light path switch disk 3.

Figure 4:
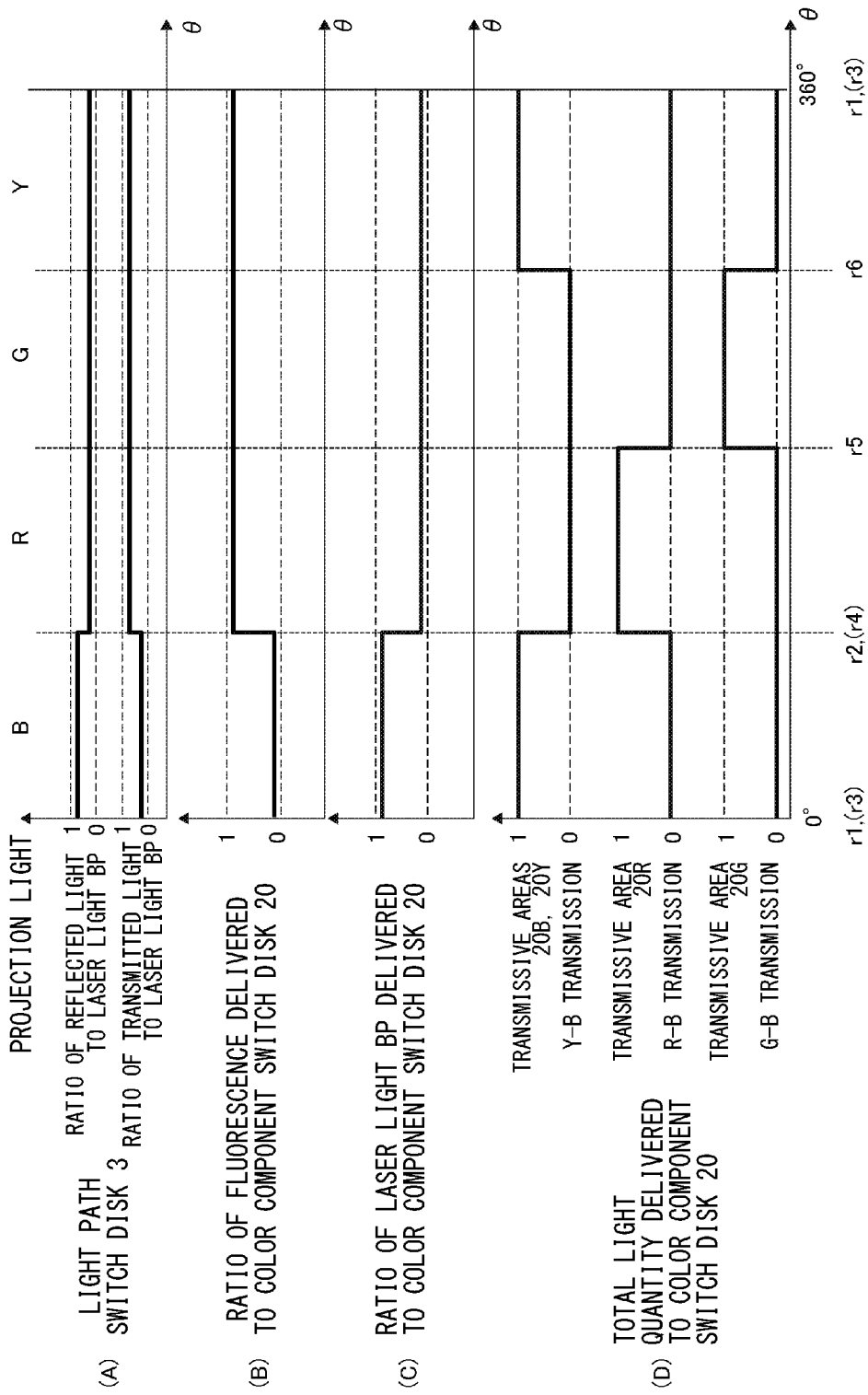
FIG. 4 is a timing chart for schematically explaining relationships between light quantities and projection periods of projection light of color components B, R, G, and Y generated by the light path switch disk, the color component switch disk, laser diodes and a fluorescent member illustrated in FIG. 1.

(A) of FIG. 4 presents ratios of the laser light BP reflected by and transmitted through the light path switch disk 3 during a projection period of the projection light of each of the color components B, R, G, and Y onto the screen S.

Specifically, reflection 1 indicates that the ratio of reflected light to the laser light BP is "100%" and reflection 0 indicates the ratio of reflected light to the laser light BP is "0%".

Similarly, transmission 0 indicates that the ratio of transmitted light to the laser light BP is "0%" and transmission 1 indicates that the ratio of transmitted light to the laser light BP is "100%".

Two solid lines indicate that about 97% of the laser light BP is reflected (about 3% of the laser light BP is transmitted) in the projection period of the projection light of color component B, and about 97% of the laser light BP is transmitted (about 3% of the laser light BP is reflected) in the projection periods of the projection light of color components R, G, and Y.

(B) of FIG. 4 indicates a ratio of the fluorescence delivered to the color component switch disk 20 during a projection period of the projection light of each of the color components B, R, G, and Y onto the screen S. Specifically, "1" indicates a light quantity of the fluorescence generated by the fluorescent member 5 when all the laser light BP is delivered to the fluorescent member 5, and "0" indicates a light quantity of fluorescence generated when all the laser light BP is reflected.

A solid line indicates that about 3% of the fluorescence is delivered to the color component switch disk 20 in the projection period of the projection light of color component B, and about 97% of the fluorescence is delivered to the color component switch disk 20 in the projection periods of the projection light of color components R, G and Y.

(C) of FIG. 4 presents a ratio of the light quantity of the laser light BP delivered to the color component switch disk 20 during a projection period of the projection light of each of the color components B, R, G, and Y onto the screen S. Specifically, "1" indicates a ratio of the light quantity of the laser light BP obtained when all the laser light BP is reflected by the light path switch disk 3 and delivered to the color component switch disk 20, and "0" indicates a ratio of the light quantity of the laser light BP obtained when all the laser light BP is transmitted through the light path switch disk 3 and delivered to the fluorescent member 5.

A solid line indicates that about 97% of the laser light BP is delivered to the color component switch disk 20 in the projection period of the projection light of color component B, and about 3% of the laser light BP is delivered to the color component switch disk 20 in the projection periods of the projection light of color components R, G, and Y.

It should be noted that the above explanation is provided on the condition that the fluorescence conversion efficiency is assumed to be "1" and a light quantity loss by all the optical constituents installed in the optical system, a light quantity loss due to unmixing of fluorescence and the like are ignored.

When the rotation angle θ of the color component switch disk 20 is within an angle range from the border region r3 to the border region r4, which corresponds to the angle range of the rotation angle θ from the border region r1 to the border region r2 of the light path switch disk 3, the laser light BP in a light quantity of about 97% and the fluorescence of yellow component Y in a light quantity of about 3% are delivered to the transmissive area 20B of the color component switch disk 20.

Accordingly, as illustrated in (D) of FIG. 4, in the projection period of the projection light of blue component B, the laser light BP of blue component B and the fluorescence of yellow component Y pass through the transmissive area 20B. In (D) of FIG. 4, Y-B transmission 1 indicates the transmission of the laser light BP and the fluorescence of yellow component Y.

In short, cyan light being a color-mixed light of the fluorescence of yellow component Y at a light quantity ratio of "0.03" and the laser light BP of blue component B at a light quantity ratio of "0.97" is delivered to the light tunnel 19.

As a result, Y-B colored light in a total light quantity ratio of "1" passes through the color component switch disk 20 and is projected onto the screen S. On the other hand, R-B colored light in a total light quantity ratio of "1" and G-B colored light in a total light quantity ratio of "1" are not projected on the screen S.

When the light path switch disk 3 is located at a rotation angle θ within an angle range from the border region r2 to the border region r1, the focused spot BSP falls on the second reflective-transmissive area 3*b*, and the laser light BP in a light quantity of about 97% of the total light quantity of the focused spot BSP is delivered as excitation light to the fluorescent member 5. The laser light BP in a light quantity of about 3% which is the rest of the focused spot BSP is reflected by the second reflective-transmissive area 3*b* and is directly delivered to the color component switch disk 20.

When the rotation angle θ of the color component switch disk 20 is within an angle range from the border region r4 to the border region r5, the fluorescence of yellow component Y in a light quantity of about 97% and the laser light BP in a light quantity of about 3% are delivered to the transmissive area 20R.

The transmissive area 20R transmits light of red component R and light of blue component B. Thus, R-B colored light in a total light quantity ratio of "1" passes through the color component switch disk 20 and is projected to the screen S, but Y-B colored light and G-B colored light each in a total light quantity ratio of "1" are not projected onto the screen S.

When the rotation angle θ of the color component switch disk 20 is within an angle range from the border region r5 to the border region r6, the fluorescence of yellow component Y in a light quantity of about 97% and the laser light BP in a light quantity of about 3% are delivered to the transmissive area 20G.

The transmissive area 20G transmits light of green component G and light of blue component B. Thus, G-B colored light in a total light quantity ratio of "1" passes through the color component switch disk 20 and is projected to the screen S, but Y-B colored light and R-B colored light each in a total light quantity ratio of "1" are not projected onto the screen S.

When the rotation angle θ of the color component switch disk 20 is within an angle range from the border region r6 to the border region r1, the fluorescence of yellow component Y in a light quantity of about 97% and the laser light BP in a light quantity of about 3% are delivered to the transmissive area 20Y.

The transmissive area 20Y transmits light of yellow component Y and light of blue component B. Thus, Y-B colored light in a total light quantity ratio of "1" passes through the color component switch disk 20 and is projected to the screen S, but R-B colored light and G-B colored light each in a total light quantity ratio of "1" are not projected onto the screen S.

According to Embodiment 1, the color of light can be adjusted because the ratio between the light quantity of the laser light BP of blue component B and the light quantity of yellow component Y can be adjusted by adjusting the reflectance and transmittance indexes of the first reflective-transmissive area 3a and the second reflective-transmissive area 3b of the light path switch disk 3.

Since the visual sensitivity to the blue component B is low, a user feels a projected image dark when viewing the image without light color adjustment. According to Embodiment 1, however, the light of blue component B is mixed with the fluorescence of yellow component Y to produce more whitish light, and thereby the visual sensitivity is improved. In short, brighter light is projected onto the screen S.

In Embodiment 1, irradiation light with a single wavelength can be used because of use of the laser diodes (LD) 1a. This makes it easier to make designing for achieving color adjustment and improving the visual sensitivity.

In the case where light emission diodes (LED) are used in place of the laser diodes (LD) 1a, irradiation light of blue component with a predetermined spectral width is used.

In this case, the transmissive area 20B of the color component switch disk 20 may be formed of a transparent body having a dichroic film, and may adjust the color of light by cutting the light with a particular wavelength band from the light passing through the transparent body.

However, with this configuration, a light quantity loss occurs, and the brightness of projection light on the screen S is lowered.

In Embodiment 1, the laser light BP of blue component B and the fluorescence of yellow component Y are color-mixed by the transmissive area 20B of the color component switch disk 20. Instead, the transmissive area 20B may be formed of a transparent body (filter) having a dichroic film which transmits light of blue component B and light of green component G, and the color may be adjusted by color-mixing the light of blue component B and the light of green component G.

Alternatively, the color may be adjusted by color-mixing the light of blue component B and light of red component R.

Modified Example

Figure 5:
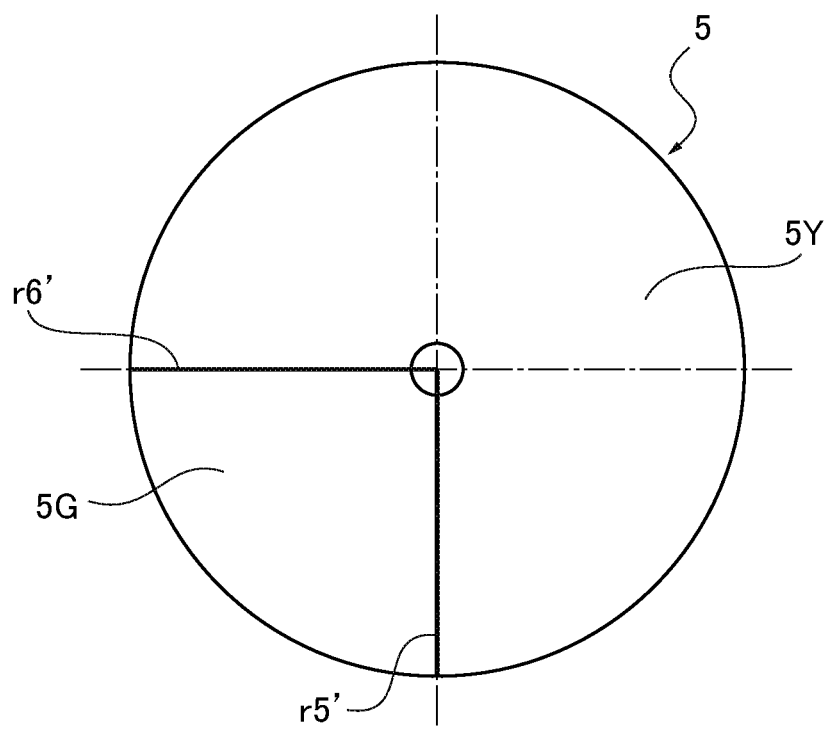
FIG. 5 is an explanatory diagram of a modified example of the fluorescent member illustrated in FIG. 1.

As illustrated in FIG. 5, the fluorescent member 5 may be provided with a sector-shaped fluorescent area 5Y for yellow component Y and a sector-shaped fluorescent area 5G for green component G, and may be configured such that the sector-shaped fluorescent area 5G is irradiated with laser light BP during a period when projection light of green component G is produced.

In FIG. 5, reference numerals r5' and r6' indicate border regions between the fluorescent area 5Y and the fluorescent area 5G. An angle range of a rotation angle θ from the border region r6' to the border region r5' of the fluorescent area 5Y corresponds to the angle range of the rotation angle θ from the border region r6 to the border region r5 of the color component switch disk 20. The fluorescent member 5 is rotated synchronously with the light path switch disk 3 and the color component switch disk 20.

In this case, since only the fluorescence of green component G is delivered to the transmissive area 20G of the color component switch disk 20, it is unnecessary to extract the fluorescence of green component G from the fluorescence of yellow component Y. Thus, fluorescence utilization efficiency can be improved in comparison with the case where only the fluorescence of yellow component Y is used.

Moreover, in this case, if the transmissive area 20G is configured to cut light in a particular wavelength band from the wavelength of the fluorescence of green component G, the chromaticity can be adjusted. For example, the purity of light of green component G can be improved if light with a long wavelength band is cut.

Instead, the fluorescent member 5 may be provided with a fluorescent area 5Y for yellow component Y and a fluorescent area for red component R (not illustrated), and may be configured such that the fluorescent area for the red component R (not illustrated) is irradiated with laser light BP during a period when projection light of red component R is produced.

In this case, since only the fluorescence of red component R is delivered to the transmissive area 20R of the color component switch disk 20, fluorescence utilization efficiency can be also improved. Similarly, if the transmissive area 20R is configured to cut light in a particular wavelength band from the wavelength of the fluorescence of red component R, the purity of light of red component R can be improved.

Embodiment 2

Figure 6:
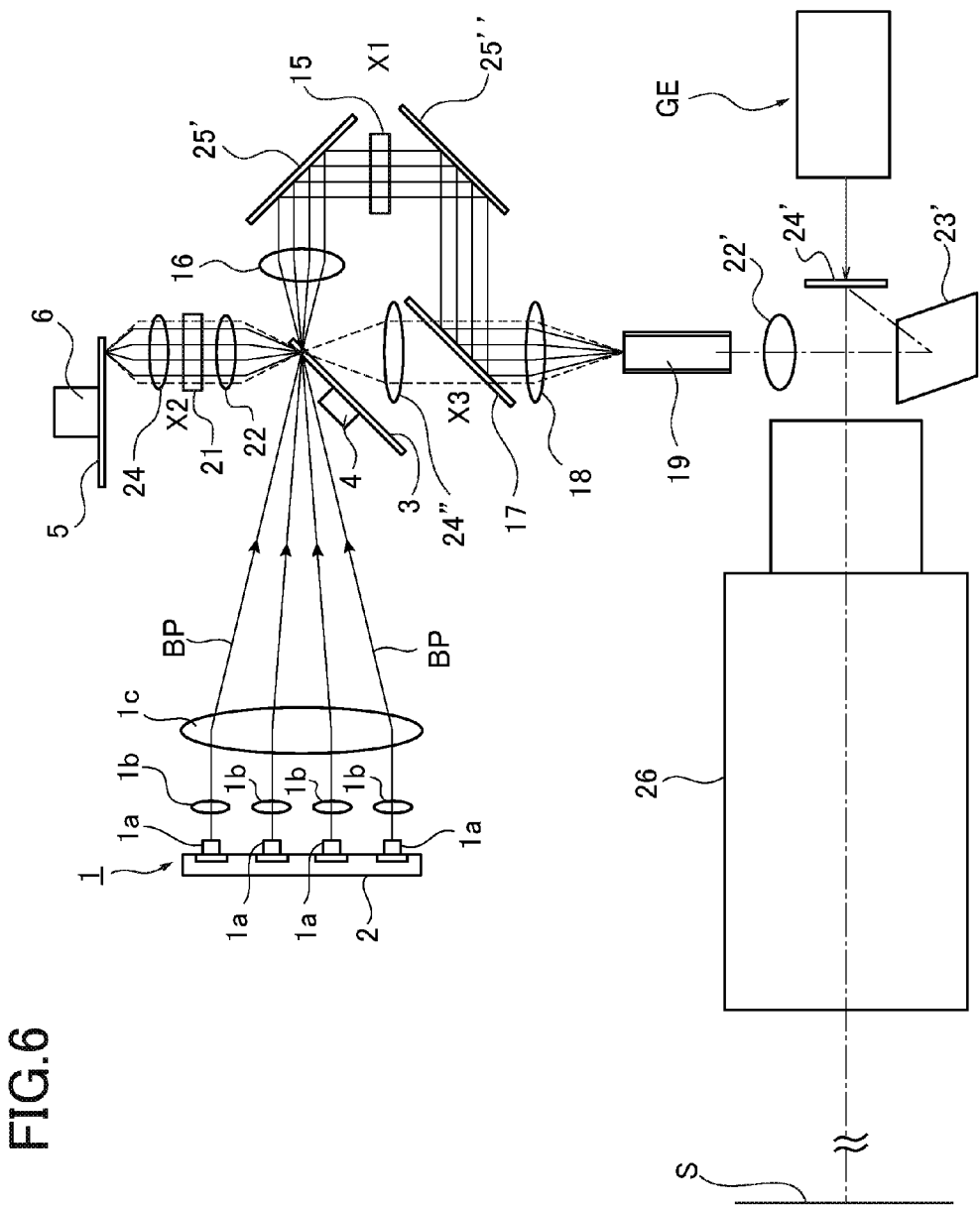
FIG. 6 is an optical diagram illustrating main constituents in an optical system for a projector according to Embodiment 2 of the present invention.

FIG. 6 is an optical diagram illustrating main constituents of an optical system of a projector including a light source device according to Embodiment 2 of the present invention.

In Embodiment 2, a light path switch disk 3 and a color component switch disk 20 are unified.

A light source unit 1 mainly includes laser diodes (LD) 1a, coupling lenses 1b and a condensing lens 1c as in Embodiment 1. Laser light from the laser diodes 1a is condensed by the coupling lenses 1b and is delivered as collimated light to the condensing lens 1c.

As in Embodiment 1, the laser diodes 1a emit laser light BP of blue component B as irradiation light.

The laser diodes 1a are used as an excitation light source to excite a fluorescent member 5, and also function as a light source to generate irradiation light of a color component to be used as projection light on a screen S. The fluorescent member 5 is provided with a fluorescent material to generate fluorescence having at least two color components by receiving the laser light BP as in Embodiment 1.

Figure 7:
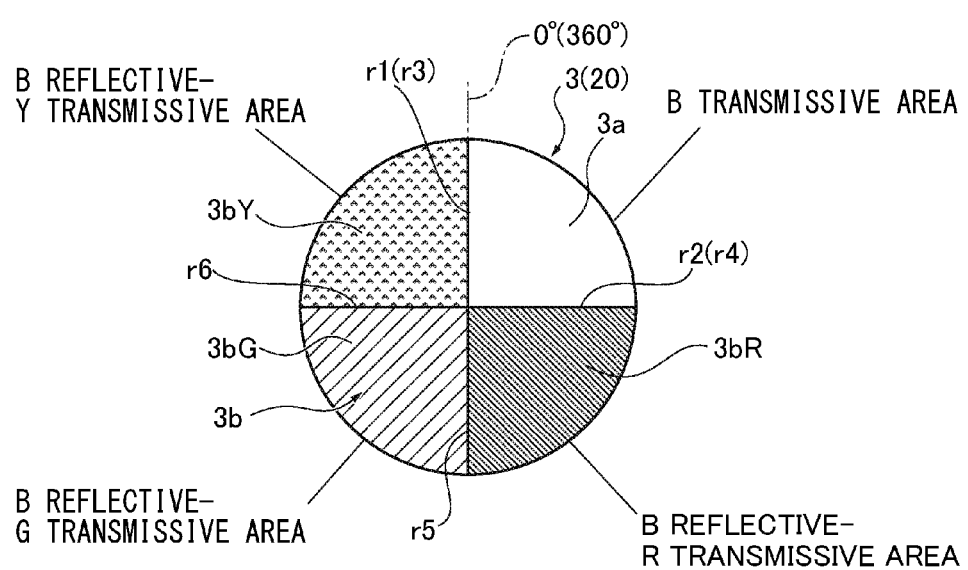
FIG. 7 is a schematic plan view illustrating a light path switch disk (color component switch disk) illustrated in FIG. 6.

The light path switch disk 3 (color component switch disk 20) includes a first reflective-transmissive area 3a and a second reflective-transmissive area 3b which are divided in a rotational direction as illustrated in FIG. 7.

Here, the first reflective-transmissive area 3a has a transmittance index or a reflectance index of transmitting about 97% of the laser light BP and reflecting about 3% of the laser light BP.

The laser light BP passed through the first reflective-transmissive area 3a is collimated by a condensing lens 16, is reflected by reflecting mirrors 25' and 25" to a dichroic mirror 17, is condensed by a condensing lens 18 and then is delivered to a light tunnel 19. In Embodiment 2, a diffuser plate 15 is disposed between the reflecting mirror 25' and the reflecting mirror 25". The light tunnel 19 and the following constituents in the optical system have the same configuration as in Embodiment 1.

The second reflective-transmissive area 3b has a transmittance index or a reflectance index of reflecting about 97% of the laser light BP and transmitting about 3% of the laser light BP.

This second reflective-transmissive area 3b is divided into three areas, which are a sector-shaped reflective-transmissive area 3bR to transmit fluorescence of red component R, a sector-shaped reflective-transmissive area 3bG to transmit fluorescence of green component G, and a sector-shaped reflective-transmissive area 3bY to transmit fluorescence of yellow component Y (fluorescence of red component R and fluorescence of green component G).

Thus, in Embodiment 2, the light path switch disk 3 (color component switch disk 20) is divided into four reflective-transmissive areas by 90 degrees.

When the second reflective-transmissive area 3b is irradiated with laser light BP, the laser light BP in a light quantity of about 97% is reflected to the condensing lens 22, and is collimated by the condensing lens 22. The collimated light is delivered to the condensing lens 24 through a diffuser plate 21 in an excitation light path X2, is condensed by the condensing lens 24 and then is applied to the fluorescent member 5.

Fluorescence of yellow component Y is generated from the laser light BP applied to the fluorescent member 5, and this fluorescence again passes through the excitation light path X2 and is delivered to the second reflective-transmissive area 3b of the light path switch disk 3.

When the sector-shaped transmissive area 3bR is irradiated with the fluorescence of yellow component Y, the transmissive area 3bR cuts the fluorescence of green component G while transmitting only the fluorescence of red component R to a condensing lens 24". The condensing lens 24" condenses and collimates the fluorescence of red component R and delivers the collimated fluorescence to the dichroic mirror 17. The dichroic mirror 17 has characteristics of transmitting fluorescence of red component R and fluorescence of green component G and of reflecting laser light BP of blue component B.

When the sector-shaped transmissive area 3bG is irradiated with the fluorescence of yellow component Y, the transmissive area 3bG cuts the fluorescence of red component R while transmitting only the fluorescence of green component G to the condensing lens 24". The condensing lens 24" condenses and collimates the fluorescence of green component G and delivers the collimated fluorescence to the dichroic mirror 17.

When the sector-shaped transmissive area 3bY is irradiated with the fluorescence of yellow component Y, the transmissive area 3bY transmits the fluorescence of red component R and the fluorescence of green component G to the condensing lens 24". The condensing lens 24" condenses and collimates the fluorescence of red component R and the fluorescence of green component G and delivers the collimated fluorescence to the dichroic mirror 17.

In Embodiment 2, a light path between the light path switch disk 3 and the dichroic mirror 17 serves as a fluorescence light path X3 for delivering fluorescence to the light tunnel 19.

The light path switch disk (color component switch disk 20) 3 has a function as a light path switch member to switch the light path between the excitation light path X2 to deliver the laser light BP as excitation light to the fluorescent member 5 and the projection light path X1 to deliver the laser light BP as projection light of color component B, and also has a function to deliver the fluorescence generated by the fluorescent member 5 to the dichroic mirror 17. In Embodiment 2, the dichroic mirror 17 functions as a light path merger unit to merge the fluorescence light path X3 and the projection light path X1.

In Embodiment 2, the light path switch disk 3 and the color component switch disk 20 are unified. Thus, the number of rotary disks can be reduced. This enables simplification of the configuration of the light source device and cost reduction.

Moreover, if the light path switch disk 3 and the color component switch disk 20 are separately formed as in Embodiment 1, the disks 3 and 20 need to be controlled to rotate synchronously. However, in Embodiment 2, since the light path switch disk 3 and the color component switch disk 20 are unified, synchronization control for them is not needed any more. Thus, the rotation control can be simplified.

For example, if the fluorescent member 5 is formed to be divided into a fluorescent area 5Y to generate fluorescence of yellow component Y and a fluorescent area 5G to generate fluorescence of green component G as illustrated in FIG. 5, Embodiment 1 requires the synchronous rotation control of the three disks, namely the light path switch disk 3, the color component switch disk 20, and the fluorescent member 5 as described above. However, Embodiment 2 just requires synchronization control for only two disks, namely the fluorescent member 5 and the light path switch disk 3 (color component switch disk 20). Thus, the rotation control can be simplified.

Also in Embodiment 2, the colors of laser light BP of blue component B and fluorescence can be mixed, and therefore color adjustment, brighter-color projection light and chromaticity adjustment can be achieved as in Embodiment 1.

Incidentally, in Embodiment 2, the excitation light path X2 is formed by reflecting the laser light BP, and the projection light path X1 is formed by transmitting the laser light BP. However, the projection light path X1 may be formed by reflecting the laser light BP and the excitation light path X2 may be formed by transmitting the laser light BP.

Embodiment 3

Embodiment 3 is described with the same constituents as those in Embodiment 1 indicated by the same reference numerals as those in Embodiment 1. It should be noted that the color component switch disk 20 is not provided in Embodiment 3.

Figure 8:
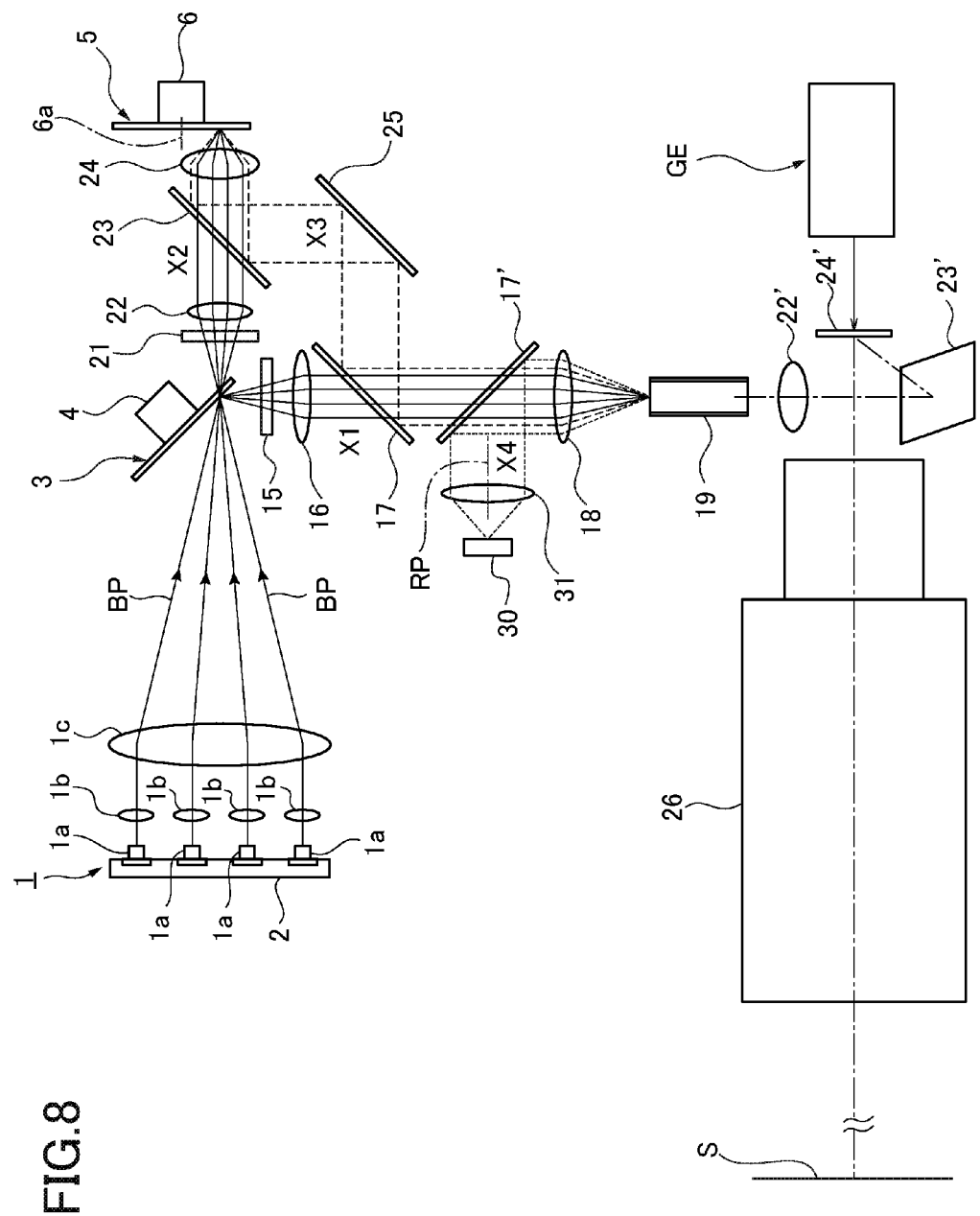
FIG. 8 is an optical diagram illustrating main constituents in an optical system for a projector according to Embodiment 3 of the present invention.

A light source unit 1 mainly includes laser diodes (LD) 1a, coupling lenses 1b and a condensing lens 1c as illustrated in FIG. 8.

Laser light from the laser diodes 1*a* is condensed by the coupling lenses 1*b* and is delivered as collimated light to the condensing lens 1*c*.

As in Embodiment 1, the laser diodes 1*a* emit laser light BP of blue component B as irradiation light.

The laser diodes 1*a* are used as an excitation light source to excite a fluorescent member 5, and also function as a light source to emit irradiation light of a color component to be used as projection light on a screen S as in Embodiment 1. A fluorescent material to generate fluorescence of green component G by receiving the laser light BP is applied to the fluorescent member 5.

Figure 9:
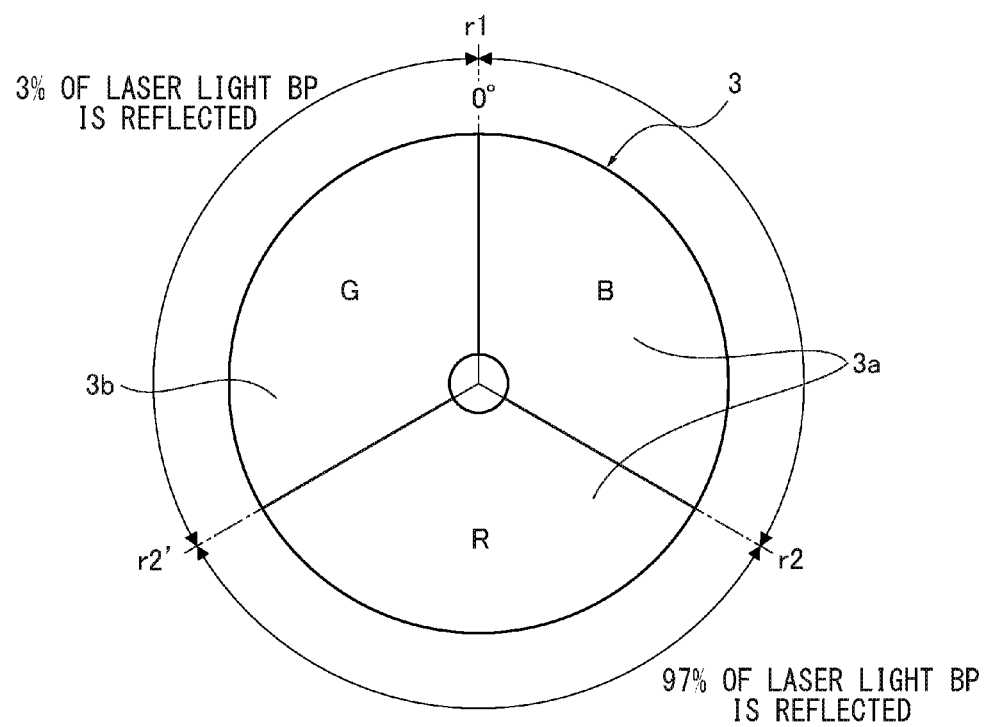
FIG. 9 is a schematic plan view illustrating a light path switch disk illustrated in FIG. 8.

A light path switch disk 3 includes a first reflective-transmissive area 3*a* and a second reflective-transmissive area 3*b* divided in a rotational direction as illustrated in FIG. 9. Here, the first reflective-transmissive area 3*a* has a transmittance index or a reflectance index of reflecting about 97% of the laser light BP and transmitting about 3% of the laser light BP. An angle range of a rotation angle θ from reference numeral r2 to reference numeral r2' is a range to be irradiated with irradiation light RP, which will be described later.

The laser light BP reflected by the first reflective-transmissive area 3*a* is collimated by a condensing lens 16, and is delivered to a dichroic mirror 17. Here, the dichroic mirror 17 has characteristics of transmitting laser light BP of blue component B and reflecting fluorescence of green component G.

The laser light BP of blue component B passed through the dichroic mirror 17 and the fluorescence of green component G reflected by the dichroic mirror 17 are delivered to a dichroic mirror 17'. This dichroic mirror 17' has characteristics of reflecting irradiation light RP of red component R and transmitting laser light BP of blue component B and fluorescence of green component G.

Here, the irradiation light RP of red component R is emitted by an LED 30 as an irradiation light source. An irradiation light path X4 of the LED 30 is provided with a condensing lens 31. This condensing lens 31 condenses and collimates the irradiation light RP from the LED 30. This collimated light is delivered to the dichroic mirror 17'.

The irradiation light RP reflected by the dichroic mirror 17' and the laser light BP of blue component B and the fluorescence of green component G passed through the dichroic mirror 17' are delivered as projection light to a condensing lens 18.

The condensing lens 18 delivers the projection light of these color components R, G, and B to a light tunnel 19. The light tunnel 19 and the following constituents in the optical system have the same configuration as in Embodiment 1.

The second reflective-transmissive area 3*b* has a transmittance index or a reflectance index of transmitting about 97% of the laser light BP and reflecting about 3% of the laser light BP.

When the second reflective-transmissive area 3*b* is irradiated with the laser light BP, the laser light BP in a light quantity of about 97% is transmitted to a condensing lens 22, and is collimated by the condensing lens 22. The collimated light is delivered through a diffuser plate 21 to a condensing lens 24, is condensed by the condensing lens 24, and then is applied to the fluorescent member 5.

Fluorescence of green component G is generated from the laser light BP applied to the fluorescent member 5.

The fluorescence of green component G is condensed and collimated by the condensing lens 24, is delivered to a dichroic mirror 23, and then is reflected to a reflecting mirror 25 by the dichroic mirror 23.

The reflecting mirror 25 reflects the fluorescence of green component G to the dichroic mirror 17. The reflecting mirror 25 and the dichroic mirror 23 constitute a fluorescence light path X3. The dichroic mirrors 17 and 23 and the reflecting mirror 25 function as a light path merger unit to merge the projection light path X1 and the fluorescence light path X3.

In Embodiment 3, as illustrated in FIG. 9, the first reflective-transmissive area 3*a* is set within an angle range of a rotation angle θ from the projection start of projection light of blue component B to the projection end of projection light of red component R.

Meanwhile, the second reflective-transmissive area 3*b* is set within an angle range of a rotation angle θ from the projection end of projection light of red component R to the projection start of projection light of blue component B.

Figure 10:
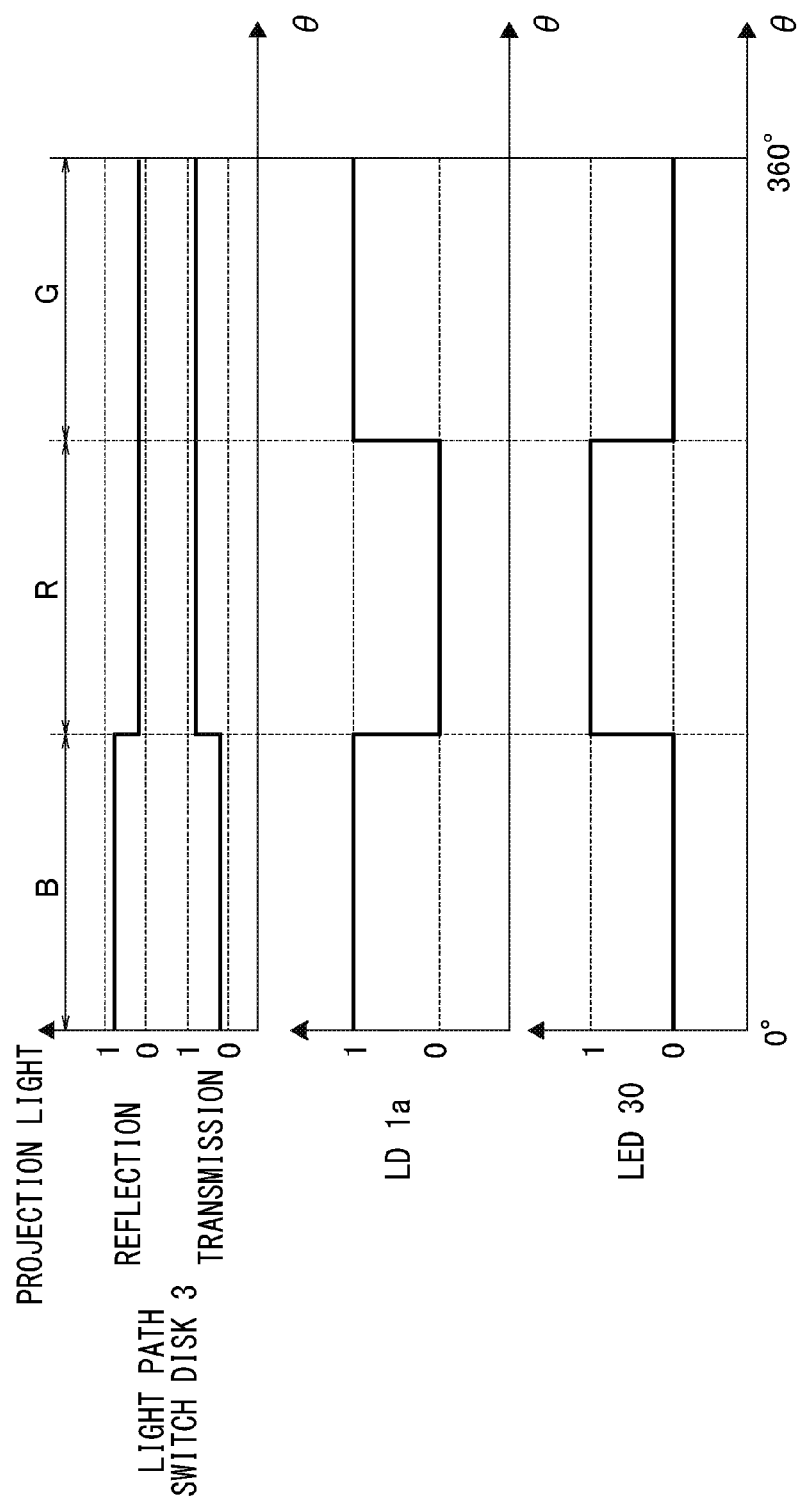
FIG. 10 is a timing chart for schematically explaining relationships between light quantities and projection periods of projection light of color components B, R, and G generated by the light path switch disk, laser diodes, a light emission diode, and a fluorescent member illustrated in FIG. 9.

In Embodiment 3, during a period when projection light of blue component B and projection light of green component G are produced, the laser diodes (LD) 1*a* are turned on and the LED 30 is turned off as illustrated in FIG. 10.

On the other hand, during a period when projection light of red component R is produced, the LED 30 is turned on and the laser diodes (LD) 1*a* are turned off.

During a period when the projection light of blue component B is produced, the laser light BP in a light quantity of about 97% is delivered through the projection light path X1 to the light tunnel 19, and the fluorescence of green component G in a light quantity of about 3% is delivered through the fluorescence light path X3 to the light tunnel 19. Thus, the projection light of blue component B is color-mixed with the projection light of green component G, and thereby the color of the blue component B can be adjusted.

During a period when the projection light of green component G is produced, the fluorescence of green component G in a light quantity of about 97% is delivered to the light tunnel 19 and the light of blue component B in a light quantity of about 3% is delivered to the light tunnel 19. Thus, the color of the green component G can be adjusted.

Embodiment 3 uses the laser diodes 1*a* to emit laser light BP of blue component B and the LED (light emission diode) 30 to emit irradiation light RP of red component R. During a period when the projection light of red component R is projected, the laser diodes 1*a* are turned off. Thus, the heat generation and light emission period of the laser diodes 1*a* can be reduced. This enables extension of the lifetime of the laser diodes 1*a*, and accordingly extension of the lifetime of the projector.

Here, during the period when the projection light of red component R is produced, the color adjustment is not performed because the laser diodes 1*a* are turned off.

Incidentally, during the period when the projection light of blue component B is produced, and during the period when the projection light of green component G is produced, the LED 30 may be turned on to emit light, and the color adjustment may be performed by controlling the quantity of light emitted by the LED 30 as needed.

Modified Example 1

Figure 11:
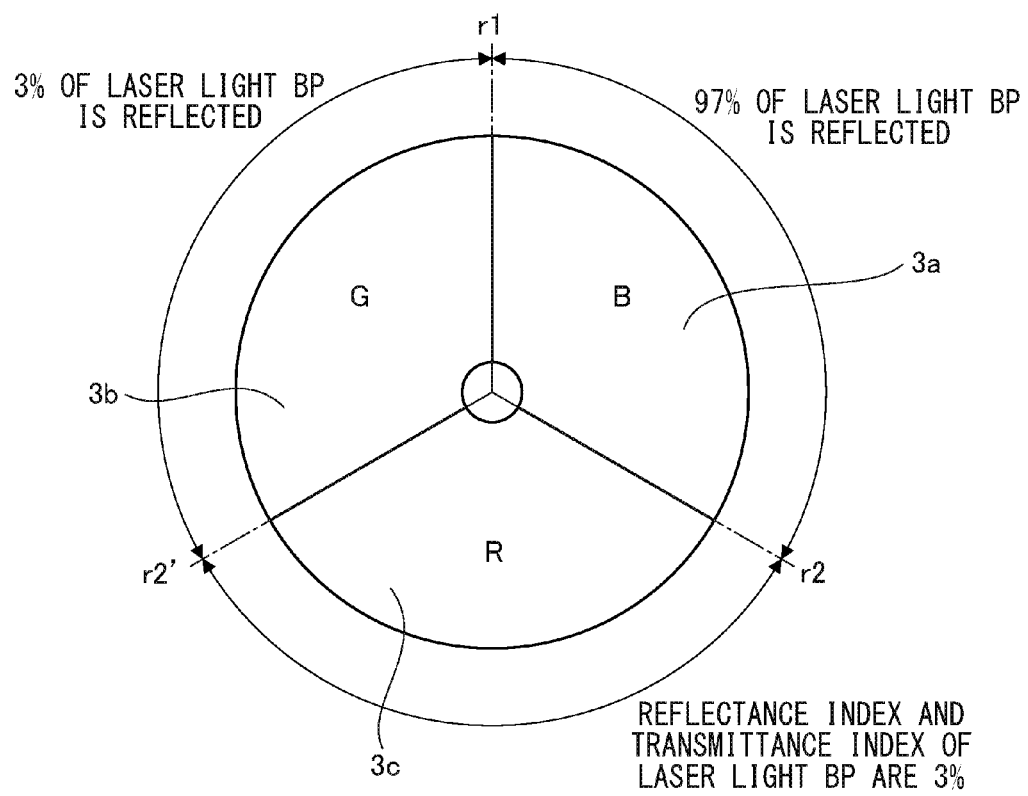
FIG. 11 is a schematic plan view illustrating a light path switch disk according to Modified Example 1 of Embodiment 3.

In Modified Example 1, as illustrated in FIG. 11, a first reflective-transmissive area 3*a* is set within an angle range of a rotation angle θ from the projection start of projection light of blue component B to the projection start of projection light of red component R.

Meanwhile, a second reflective-transmissive area 3*b* is set within an angle range of a rotation angle θ from the projection start of projection light of green component G to the projection start of projection light of blue component B.

Moreover, a third reflective-transmissive area 3c is set within an angle range of a rotation angle θ from the projection start of projection light of red component R to the projection start of projection light of green component G. This third reflective-transmissive area 3c has a reflectance index and a transmittance index of about 3%. In other words, in Modified Example 1, in addition to the first reflective-transmissive area 3a and the second reflective-transmissive area 3b, the light path switch disk 3 includes the third reflective-transmissive area 3c having a transmittance index of transmitting the rest of the laser light in the first reflective-transmissive area 3a, and having a reflectance index of reflecting the rest of the laser light in the second reflective-transmissive area 3b.

Incidentally, the reflectance index and the transmittance index of the third reflective-transmissive area 3c are not limited to those presented in Modified Example 1, but the third reflective-transmissive area 3c only has to be configured to transmit and reflect part of laser light BP.

Figure 12:
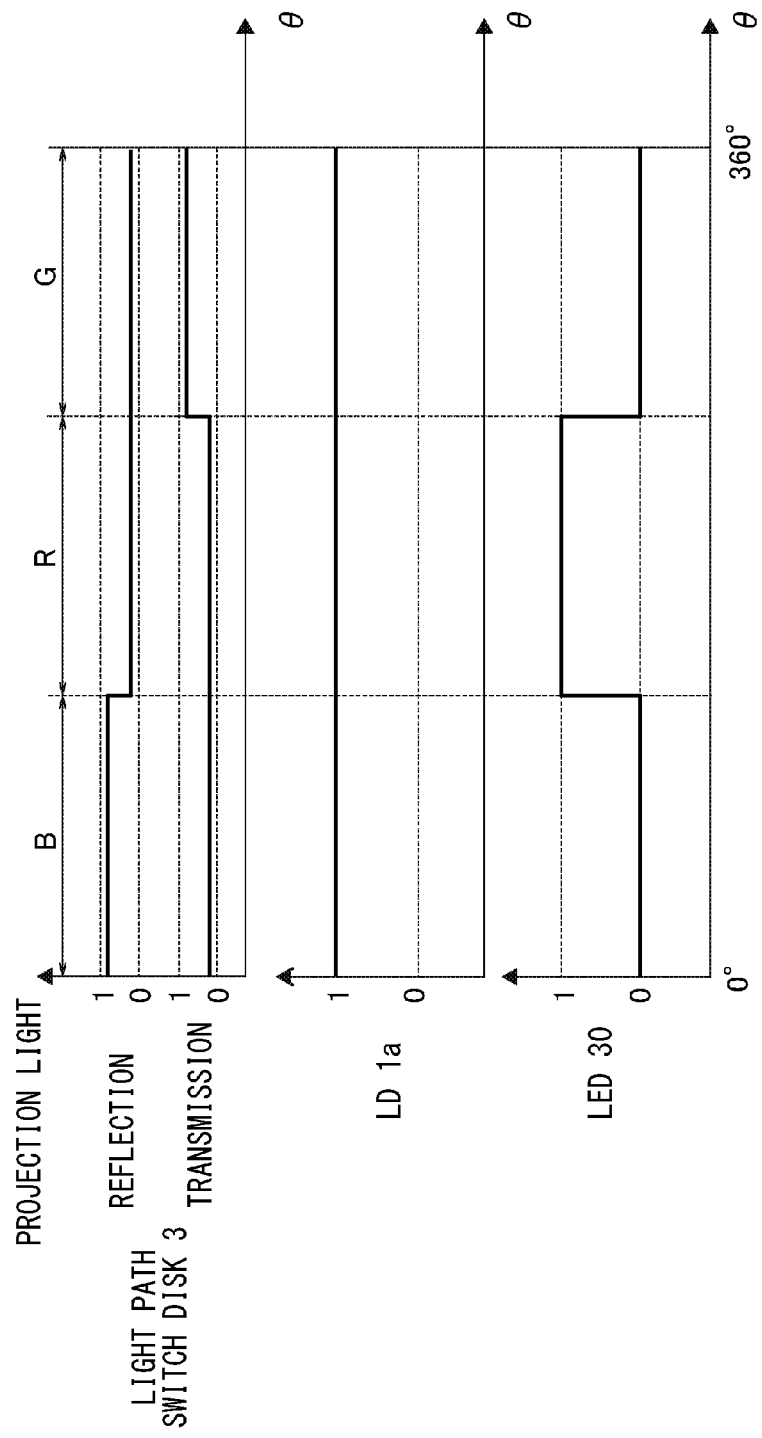
FIG. 12 is a timing chart for schematically explaining relationships between light quantities and projection periods of projection light of color components B, R, and G generated by a light path switch disk, laser diodes, a light emission diode, and a fluorescent member in the case of using the light path switch disk according to Modified Example 1 of Embodiment 3.

The laser diodes (LD) 1a are kept turned on during an entire revolution of the light path switch disk 3 as illustrated in FIG. 12.

An LED 30 is turned on during a period when projection light of red component R is produced by the LED 30, and the LED 30 is turned off during a period when projection light of blue component B and projection light of green component G are produced.

According to Modified Example 1, even during a period when the projection light of red component R is produced, the color of the projection light of red component R can be adjusted by color-mixture with projection light of blue component B and projection light of green component G. Thus, it is possible to provide a projector capable of making the above color adjustment and thereby capable of forming bright images.

Modified Example 2

Figure 13:
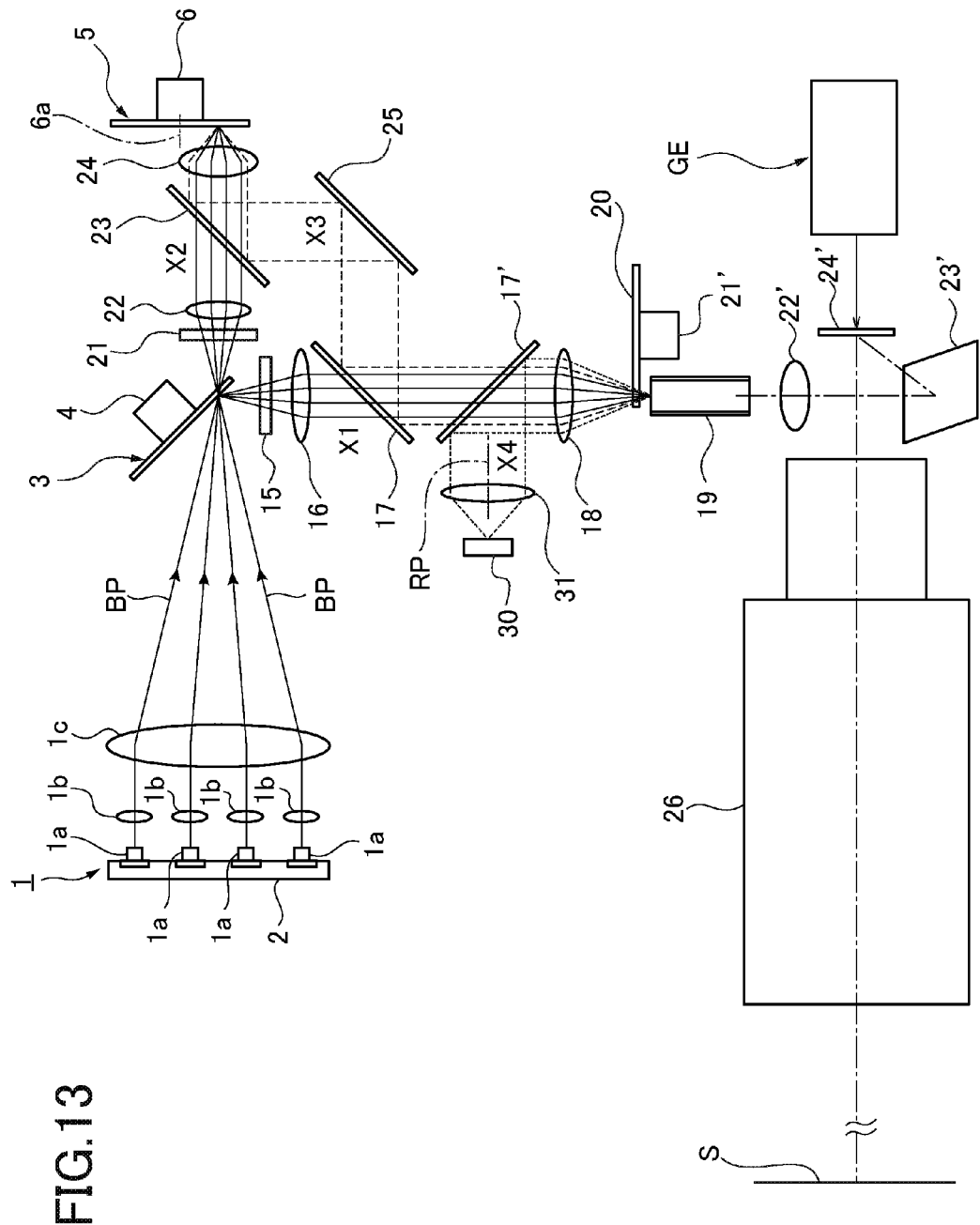
FIG. 13 is an optical diagram illustrating main constituents in an optical system for a projector according to Modified Example 2 of Embodiment 3.

As illustrated in FIG. 13, a color component switch disk 20 may be provided immediately before a light tunnel 19. The color component switch disk 20 enables further color adjustment by being used to adjust wavelength transmittance characteristics of laser light BP from laser diodes 1a, wavelength transmittance characteristics of an LED 30, and wavelength transmittance characteristics of fluorescence of green component G.

In addition, as in Embodiment 1, a fluorescent material to generate fluorescence having two color components, for example, a fluorescent material to generate fluorescence of yellow component Y may be used as a fluorescent material for a fluorescent member 5. In this case, dichroic mirrors 17 and 23 may be each formed of a dichroic mirror configured to reflect the fluorescence of yellow component Y and transmit laser light BP of blue component B, and a dichroic mirror 17' may be formed of a dichroic mirror having characteristics of transmitting the fluorescence of yellow component Y and the laser light BP of blue component B.

Moreover, the fluorescent member 5 may be provided with a fluorescent area to generate fluorescence of yellow component Y and a fluorescent area to generate fluorescence of green component G which is one of the two color components.

Although foregoing Embodiment 3 uses as the LED 30 an LED to emit irradiation light RP of red component R, another type of LED may be used. For example, a light source to emit irradiation light of green component G may be used as the LED 30, and the fluorescent member 5 may be provided with a material to generate fluorescence of red component R.

Alternatively, a laser diode (LD) may be used in place of the LED 30.

Embodiments 1 to 3 have been described hereinabove. In this connection, the light path switch disk 3 can be fabricated at low cost if the first reflective-transmissive area 3a of the light path switch disk 3 is made of a glass plate not having an anti-reflection film (AR coat).

This is because the glass plate not having an anti-reflection film (AR coat) usually has a reflectance index of about 6% and a transmittance index of about 94% and the first reflective-transmissive area 3a can be formed without needing a special process to be applied to the light path switch disk 3.

Specific Example 1 of Color Reproduction Range

Hereinafter, Specific Example 1 of a color reproduction range is described by using the optical system of the projector illustrated in Embodiment 1 (see FIG. 1). Here, the wavelength λ of the laser light BP is 465 nm.

The lighting efficiencies of the optical system in FIG. 1 are set at 32% for the red component R, the green component G and the blue component B, and at 80% for the yellow component Y.

The lighting efficiency of each of the color components R, G, B, and Y herein is defined as a ratio of a quantity of light of the color component projected on the screen S to a quantity of light emitted from the light source unit 1, where the quantity of light emitted from the light source unit 1 is 100.

In the light path switch disk 3, the angle range of the rotation angle θ of the first reflective-transmissive area 3a is 90 degrees and the angle range of the rotation angle θ of the second reflective-transmissive area 3b is 270 degrees as described above.

In the color component switch disk 20, the angle range of the rotation angle θ of each of the transmissive areas 20Y, 20B, 20R, and 20G is 90 degrees as described above.

Figure 14A:
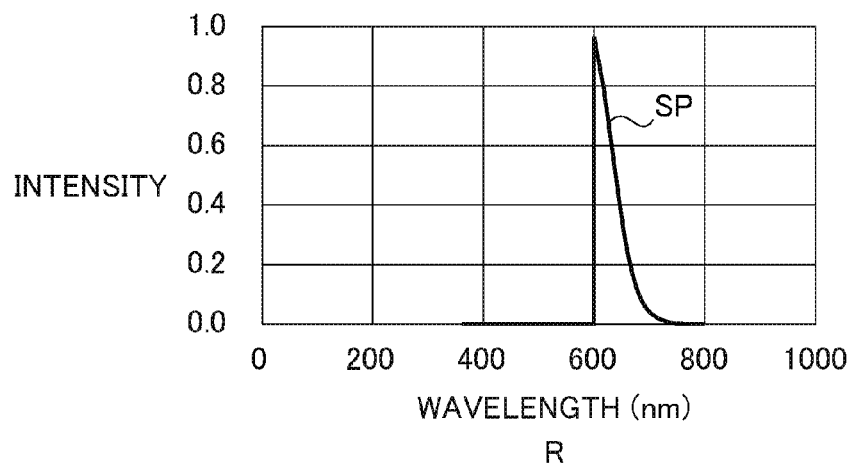
FIG. 14A to FIG. 14C present diagrams for explaining Specific Example 1 of a color reproduction range of the optical system illustrated in FIG. 1.
Figure 14B:
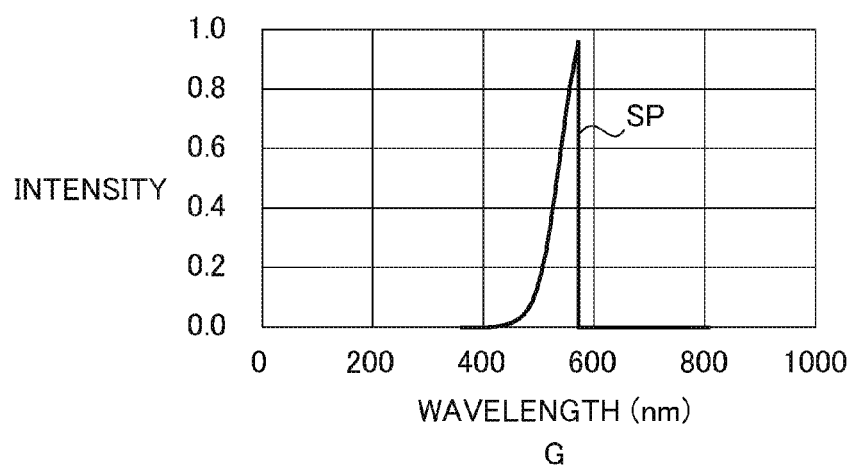
Figure 14C:
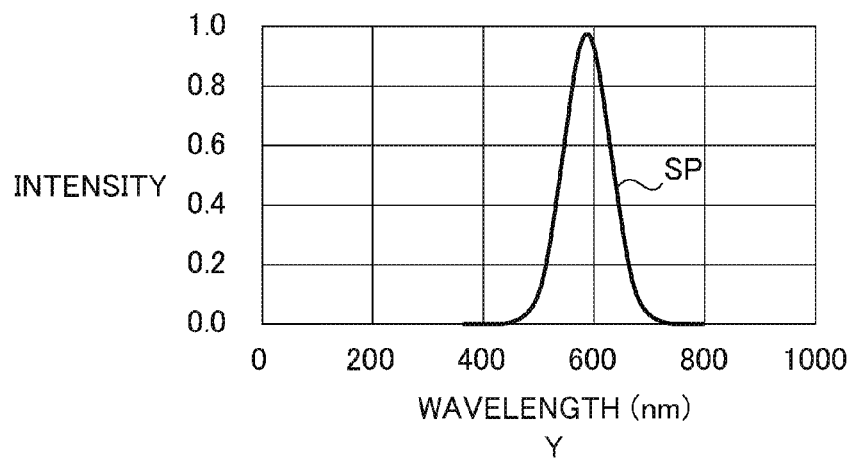

The intensity distributions of spectra SP of the color components R, G, and Y on the screen S are presented in. FIGS. 14A, 14B and 14C, respectively.

The intensity distributions of the spectra SP presented in FIGS. 14A, 14B and 14C represent intensity distributions of spectra SP obtained by extraction through the transmissive areas 20Y, 20B, 20R, and 20G.

In the color component switch disk 20, the transmissive area 20B transmits light of color component B and light of color component Y. Similarly, the transmissive area 20Y also transmits light of color component B and light of color component Y.

Here, assume that the light path switch disk 3 is configured such that the first reflective-transmissive area 3a has a reflectance index of 100%, or in other words is purely formed of a reflective area, and the second reflective-transmissive area 3b has a transmittance index of 100%, or in other words is purely formed of a transmissive area.

Figure 15:
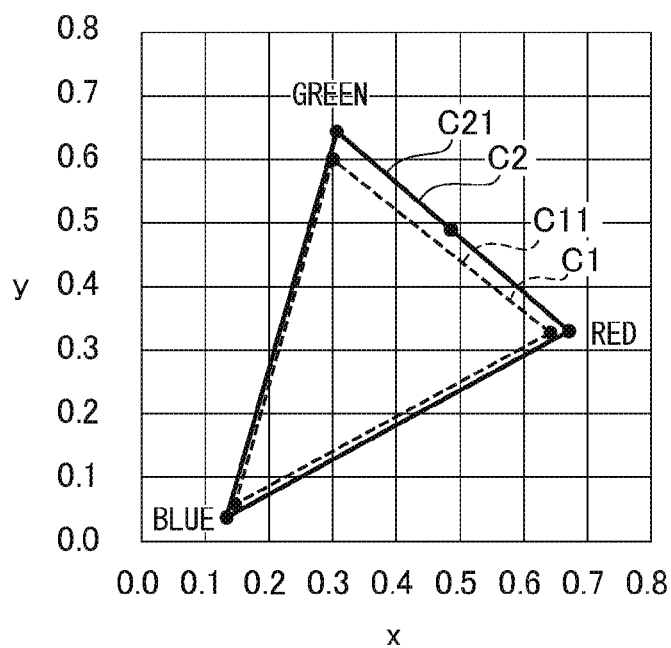
FIG. 15 is a chromaticity diagram for explaining a color reproduction range under the conditions where laser light with a wavelength of 465 nm is used and lighting efficiencies of the optical system illustrated in FIG. 1 on the screen are set at 32% for the red component R, the green component G and the blue component B and at 80% for the yellow component Y, and on the assumption that the light path switch disk illustrated in FIG. 1 is formed such that the first reflective-transmissive area has a reflectance index of 100% and the second reflective-transmissive area has a transmittance index of 100%.

The color reproduction range obtained in the above case is as presented in FIG. 15. FIG. 15 presents a chromaticity diagram in accordance with the standard specified by International Electrotechnical Commission which is an international standards organization, and a chromaticity diagram obtained when the light path switch disk 3 includes the first reflective-transmissive area 3a with the reflectance index of 100% and the second reflective-transmissive area 3b with the transmittance index of 100%.

In FIG. 15, a dashed line represents an sRGB color gamut C1 specified by the international standard, and a solid line represents a color gamut C2 obtained when the reflectance index of the first reflective-transmissive area 3a is 100% and the transmittance index of the second reflective-transmissive area 3b is 100%.

FIG. 15 presents the color gamut obtained without color adjustment by color mixing. A boundary C21 of the color gamut C2 from a red color to a green color deviates from the corresponding boundary C11 of the sRGB color gamut C1.

To eliminate such deviation, the color is adjusted by changing the reflectance index R and the transmittance index T of the first reflective-transmissive area 3a and the reflectance index R and the transmittance index T of the second reflective-transmissive area 3b in the light path switch disk 3 as presented here in Specific Example 1.

For example, the first reflective-transmissive area 3a is set to have a reflectance index R of 95% and a transmittance index T of 5%, and the second reflective-transmissive area 3b is set to have a transmittance index T of 95% and a reflectance index R of 5%.

Figure 16:
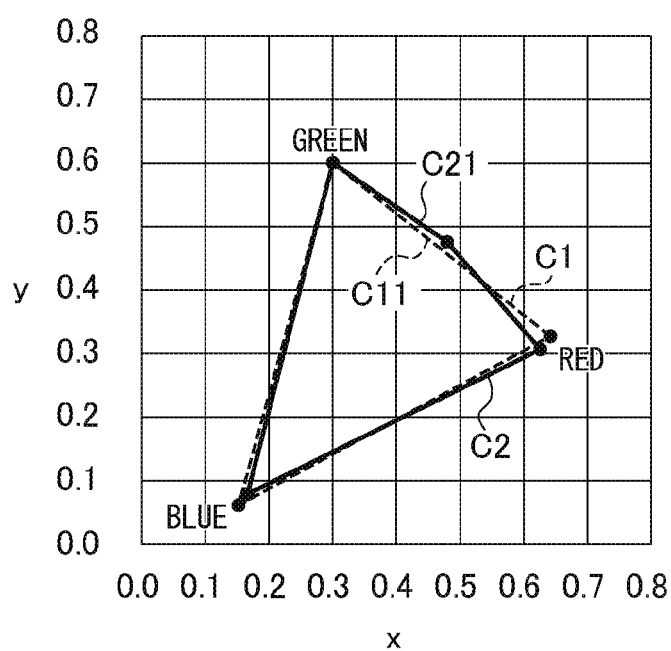
FIG. 16 is a chromaticity diagram for explaining a color reproduction range under the same conditions as those for obtaining the chromaticity diagram illustrated in FIG. 15, but on the assumption that the light path switch disk illustrated in FIG. 1 is formed such that the first reflective-transmissive area has a reflectance index of 95% and a transmittance index of 5% and the second reflective-transmissive area has a transmittance index of 95% and a reflectance index of 5%.

With these settings, the color reproduction range as presented in FIG. 16 is obtained. More specifically, light of color component B is partly transmitted through the first reflective-transmissive area 3a and is partly reflected by the second reflective-transmissive area 3b. As a result, projection light of color component B is color-mixed with light of color component Y.

Moreover, projection light of each of color component R, G and Y is color-mixed with light of color component B. In this way, the color gamut C2 in Specific Example 1 can be approximated to the international standard sRGB color gamut C1 as illustrated in FIG. 16.

FIG. 16 presents that the boundary C21 of the color gamut C2 and the boundary C11 of the color gamut C1 are roughly equal to each other.

In Specific Example 1, the first reflective-transmissive area 3a has the reflectance index R of 95% and the transmittance index T of 5%, and the second reflective-transmissive area 3b has the transmittance index T of 95% and the reflectance index R of 5%.

Although both the transmittance index T of the first reflective-transmissive area 3a and the reflectance index R of the second reflective-transmissive area 3b are 5% in Specific Example 1, these indexes are not limited to such percentage. The color adjustment is possible only if the transmittance index T of the first reflective-transmissive area 3a and the reflectance index R of the second reflective-transmissive area 3b are set to be larger than 0%.

Instead, the reflectance index R of the second reflective-transmissive area 3b may be set to 0%<R<5%, and the transmittance index T of the first reflective-transmissive area 3a may be set to 0%. With these settings, while the color of projection light of blue component B is not adjusted, the colors of projection light (illumination light) of color components R, G, and Y can be adjusted by being mixed with the color of the projection light of blue component B.

Comparative Example for Specific Example 1

Figures 17, 18:
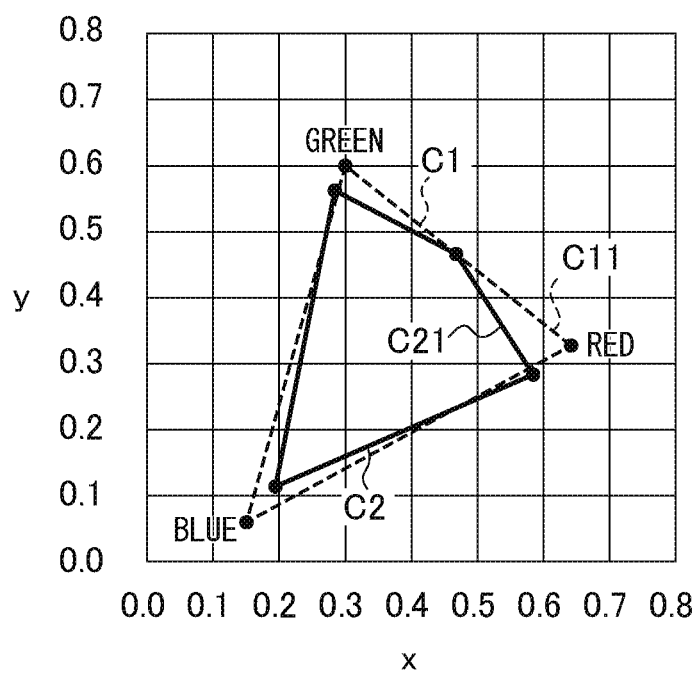
FIG. 17 is an explanatory diagram of a color reproduction range of a comparative example for Specific Example 1 of the color reproduction range of the optical system 1 illustrated in FIG. 1, and is a chromaticity diagram for explaining a color reproduction range under the same conditions as those for obtaining the chromaticity diagram illustrated in FIG. 16, but on the assumption that the light path switch disk illustrated in FIG. 1 is formed such that the first reflective-transmissive area has a reflectance index of 90% and a transmittance index of 10% and the second reflective-transmissive area has a transmittance index of 90% and a reflectance index of 10%.
FIG. 18 is a table presenting visual sensitivities under conditions where laser light with a wavelength 465 nm is used and the lighting efficiencies of the optical system illustrated in FIG. 1 on the screen are set at 32% for the red component R, the green component G and the blue component B and at 80% for the yellow component Y, by comparing a case where the light path switch disk illustrated in FIG. 1 is formed such that the first reflective-transmissive area has a reflectance index of 100% and the second reflective-transmissive area has a transmittance index of 100%, and a case where the light path switch disk illustrated in FIG. 1 is formed such that the first reflective-transmissive area has a reflectance index of 95% and a transmittance index of 5%, and the second reflective-transmissive area has a transmittance index of 95% and a reflectance index of 5%.

FIG. 17 presents a comparative example for the color reproduction range in Specific Example 1 presented in FIG. 16. FIG. 17 presents a chromaticity diagram for explaining a color reproduction range obtained when the first reflective-transmissive area 3a has a reflectance index R of 90% and a transmittance index T of 10%, and the second reflective-transmissive area 3b has a transmittance index T of 90% and a reflectance index R of 10%.

As is apparent from FIG. 17, the color gamut C2 in the comparative example becomes much narrower than the sRGB color gamut C1 when the transmittance index T of the first reflective-transmissive area 3a and the reflectance index R of the second reflective-transmissive area 3b are set too high.

Accordingly, to approximate the color reproduction range to the international standard, it is desirable to set the transmittance index T of the first reflective-transmissive area 3a to 0%<T≤5% and to set the reflectance index R of the second reflective-transmissive area 3b to 0%<R≤5%.

FIG. 18 is a table presenting a comparison between a visual sensitivity lm/W achieved by the light path switch disk 3 in which the reflectance index R of the first reflective-transmissive area 3a is 100% (that is, the first reflective-transmissive area 3a is purely formed of a reflective area) and the transmittance index T of the second reflective-transmissive area 3b is 100% (that is, the second reflective-transmissive area 3b is purely formed of a transmissive area), and a visual sensitivity lm/W achieved by the light path switch disk 3 in which the transmittance index T of the first reflective-transmissive area 3a is 5% and the reflectance index R of the second reflective-transmissive area 3b is 5%.

Here, lm denotes lumen (luminous flux), W denotes radiant flux (energy emitted per unit time), and the lumen lm can be calculated in accordance with lm=683×W×Y-tristimulus value.

According to Specific Example 1, the color mixing results in the achievement of color adjustment and the improvement in the visual sensitivity for blue component B.

The visual sensitivity lm/W for the blue component B is 96 in the example presented in FIG. 16, and is 50 in the example presented in FIG. 15. Thus, the visual sensitivity lm/W in FIG. 16 is improved by 1.92 times from that in FIG. 15 (lm/W=96/50=1.92).

Specific Example 2 of Color Reproduction Range

In Specific Example 1, the laser diodes to emit laser light BP with a wavelength λ of 465 nm are used as the laser diodes 1a to emit light of blue component B. However, the wavelength λ of the laser light BP of the laser diodes 1a may be within a wavelength band from 440 nm to 470 nm, instead.

Appropriate selection of the wavelength λ of the laser diodes 1a enables the color gamut C2 to more approximate to the color gamut C1 by color-mixing of light of blue component B into illumination light of the other color components R, G, and Y.

The reason for this is described below by using the optical system illustrated in FIG. 1.

The lighting efficiencies of the optical system illustrated in FIG. 1 are set at 32% for the light of red component R, green component G, and blue component B, and at 80% for the light of yellow component Y, as described above.

Moreover, in the light path switch disk 3, the angle range of the first reflective-transmissive area 3a is 90 degrees, and the angle range of the second reflective-transmissive area 3b is 270 degrees as illustrated in FIG. 2. In the color component switch disk 20, each of the angle ranges of the transmissive areas 20B, 20R, 20G, and 20Y is 90 degrees as illustrated in FIG. 3.

Then, the intensity distributions of the spectra SP of the color components R, G, and Y on the screen are set as illustrated in FIGS. 14A, 14B and 14C, and the transmittance index T of the second reflective-transmissive area 3b in the light path switch disk 3 is set at 100%.

In Specific Example 2, description is provided for the case where illumination light of blue component B is color-mixed with illumination light of green component G.

More specifically, the optical system is configured to, when projecting illumination light of blue component B onto the screen S, transmit part of light of blue component B through the first reflective-transmissive area 3a to the fluorescent member 5, and to deliver fluorescence of yellow component Y generated by the fluorescent member 5 to the color component switch disk 20.

Moreover, the transmissive area 20B of the color component switch disk 20 is provided with, as transmittance characteristics, optical characteristics of transmitting the illumination light of blue component B and the illumination light of green component G having the intensity distribution of the spectrum SP presented in FIG. 14B, and thereby is configured to perform color-mixing of illumination light of blue component B with illumination light of green component G.

Figure 19:
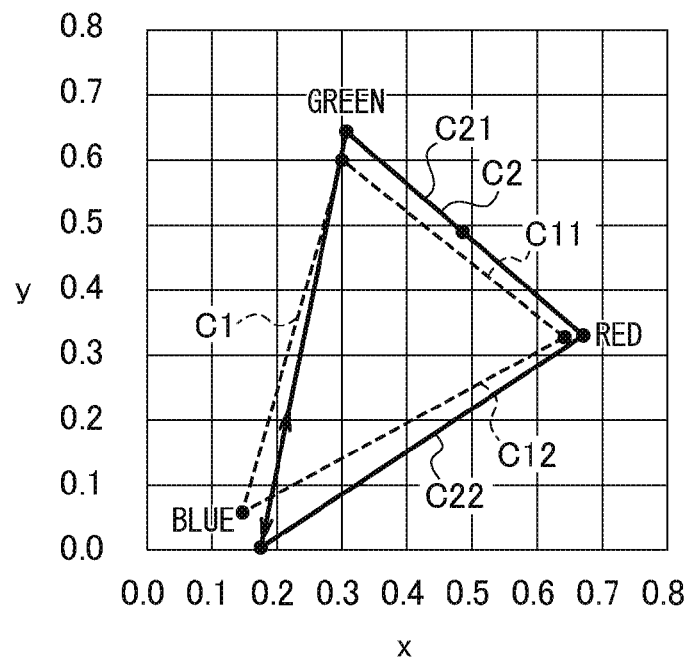
FIG. 19 is a diagram for explaining Specific Example 2 of a color reproduction range of the optical system illustrated in FIG. 1, and is a chromaticity diagram for explaining a color reproduction range under the conditions where laser light with a wavelength of 380 nm is used and the lighting efficiencies of the optical system illustrated in FIG. 1 on the screen are set at 32% for the red component R, the green component G and the blue component B and at 80% for the yellow component Y, and on the assumption that the light path switch disk illustrated in FIG. 1 is formed such that the first reflective-transmissive area has a reflectance index of 100% and the second reflective-transmissive area has a transmittance index of 100%.

FIG. 19 presents a color reproduction range obtained when the reflectance index R of the first reflective-transmissive area 3a in the light path switch disk 3 is 100% and the wavelength λ of laser light BP of the laser diodes 1a is 380 nm. When the wavelength λ of laser light BP is set to 380 nm, the deviation of the color gamut C2 from the color gamut C1 is large around a blue-to-purple region as illustrated in FIG. 19.

Here, if illumination light of blue component B is color-mixed with illumination light of green component G, the chromaticity of the blue component B in the color gamut C2 are changed in arrow directions. Thus, even when laser light BP with a wavelength λ 380 nm is used, a boundary C22 of the color gamut C2 on a blue color side can be approximated to a boundary C12 of the color gamut C1.

In the above case, if the first reflective-transmissive area 3a of the light path switch disk 3 has a reflectance index R of 99.9% and a transmittance index T of 0.1%, for example, the boundary C22 of the color gamut C2 on the blue color side is approximated to the boundary C12 of the color gamut C1 on the blue color side.

Figure 21:
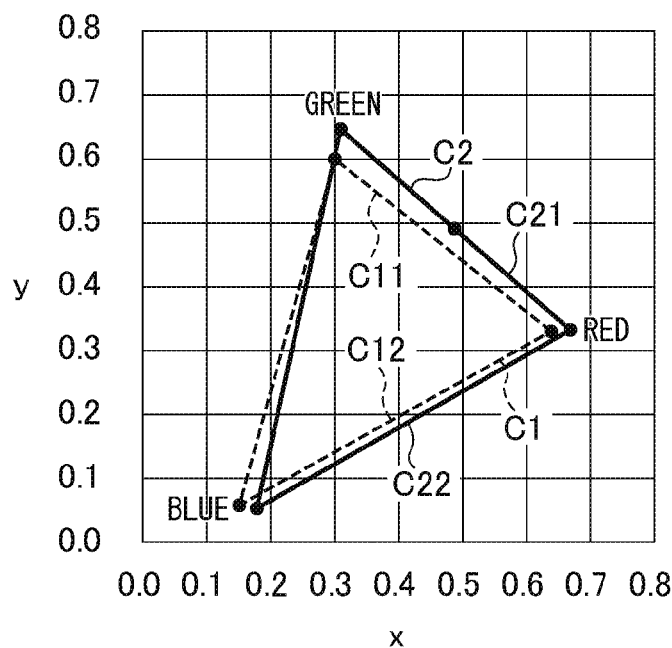
FIG. 21 is a diagram for explaining Specific Example 2 of a color reproduction range of the optical system illustrated in FIG. 1, and is a chromaticity diagram for explaining a color reproduction range obtained, under the conditions where laser light with a wavelength of 440 nm is used and the lighting efficiencies are set to be the same as those for obtaining the chromaticity diagram illustrated in FIG. 20, with the blue component and the green component color-mixed on the assumption that the light path switch disk illustrated in FIG. 1 is formed such that the first reflective-transmissive area has a reflectance index of 90% and a transmittance index of 10%.

Next, if the wavelength λ of laser light BP of the laser diodes 1a is 440 nm, and the first reflective-transmissive area 3a in the light path switch disk 3 has a reflectance index R of 90% and a transmittance index T of 10%, a color reproduction range presented in FIG. 21 is obtained.

When the wavelength λ of laser light BP is 440 nm, a line connecting the pure color of blue component B and the pure color of green component G which are obtained without color mixture by the light path switch disk 3 comes closer to the corresponding boundary of the sRGB color gamut C1. Thus, the color gamut C2 on a blue color side can be more approximated to the sRGB color gamut C1 with color mixture.

More specifically, the chromaticity actually reproduced can be made closer to the sRGB chromaticity. In FIG. 21, the pure blue color in the color gamut C2 is located near and to the right of the pure blue color in the color gamut C1.

Figure 22:
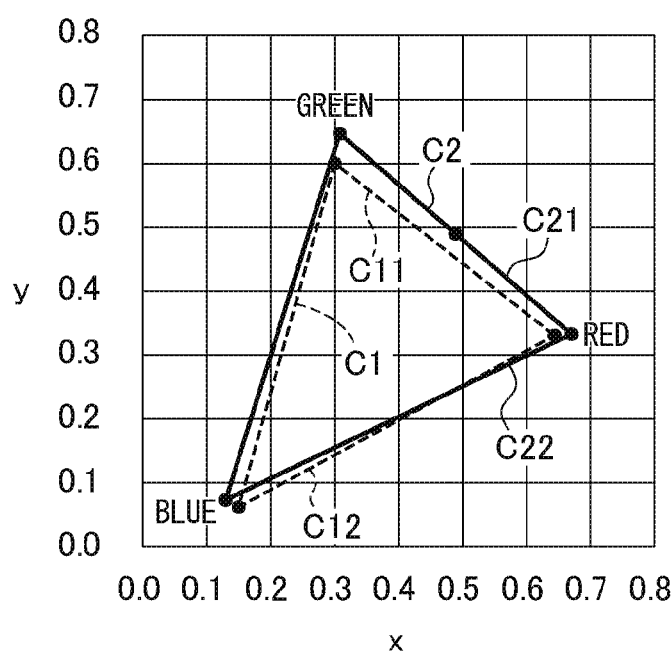
FIG. 22 is a diagram for explaining Specific Example 2 of a color reproduction range of the optical system illustrated in FIG. 1, and is a chromaticity diagram of a color reproduction range obtained, under the conditions where laser light with a wavelength of 470 nm is used and the lighting efficiencies are set to be the same as those for obtaining the chromaticity diagram illustrated in FIG. 20, with the blue component and the green component color-mixed on the assumption that the light path switch disk illustrated in FIG. 1 is formed such that the first reflective-transmissive area has a reflectance index of 97% and a transmittance index of 3%.

In contrast, when the wavelength λ of laser light BP is 470 nm, and the first reflective-transmissive area 3a of the light path switch disk 3 has a reflectance index R of 97% and a transmittance index T of 3%, a color reproduction range presented in FIG. 22 is obtained. In FIG. 22, the pure blue color in the color gamut C2 is located to the left of the pure blue color in the color gamut C1.

Here, the pure color means a color without color mixture.

Accordingly, if the wavelength λ of laser light BP is 440 nm<λ<470 nm, color mixing of illumination light of blue component B with illumination light of green component G makes the color gamut approximated to the color gamut of the international standard on the blue color side.

Next, description is provided for a change in the color reproduction range in relation to the wavelength λ of laser light BP.

Figure 20:
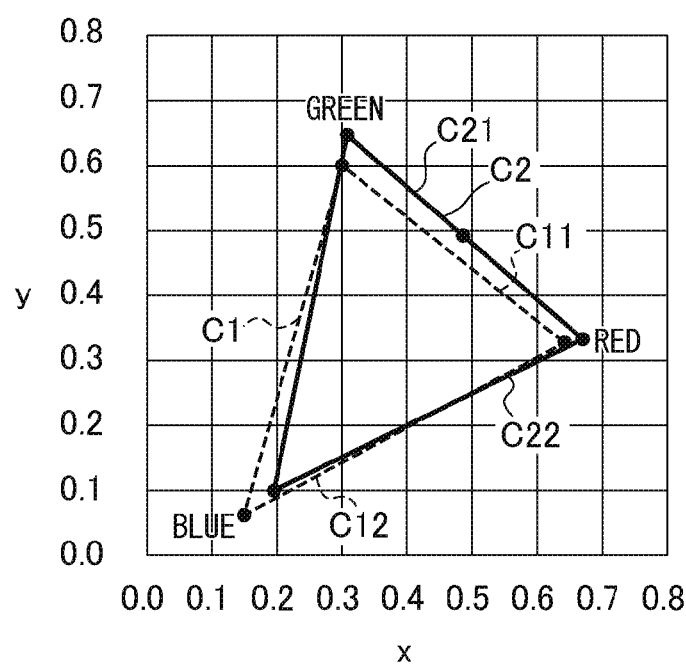
FIG. 20 is a diagram for explaining Specific Example 2 of a color reproduction range of the optical system illustrated in FIG. 1, and is a chromaticity diagram for explaining a color reproduction range obtained, under the same conditions as those for obtaining the chromaticity diagram illustrated in FIG. 19, with the blue component and the green component color-mixed on the assumption that the light path switch disk illustrated in FIG. 1 is formed such that the first reflective-transmissive area has a reflectance index of 99.9% and a transmittance index of 0.1%.
Figure 23:
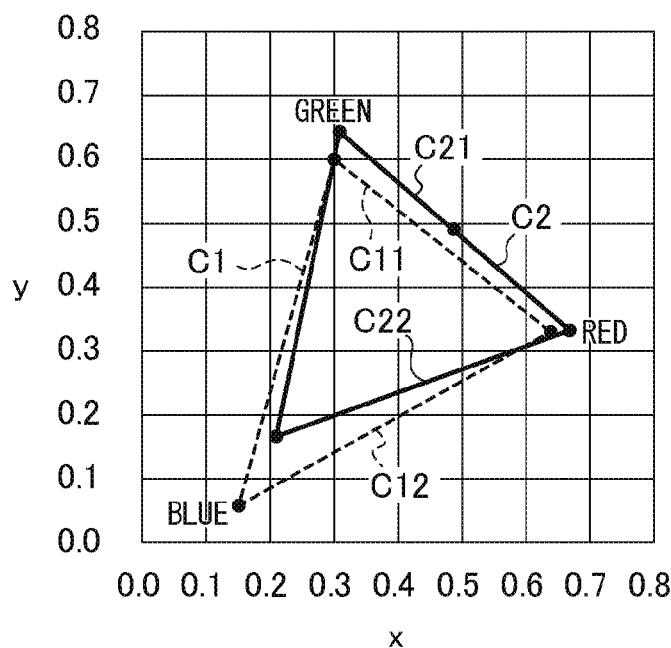
FIG. 23 is a diagram for explaining Specific Example 2 of a color reproduction range of the optical system illustrated in FIG. 1 with respect to the wavelength of laser light, and is a chromaticity diagram for explaining a color reproduction range under the conditions where laser light with a wavelength of 380 nm is used and the lighting efficiencies are set to be the same as those for obtaining the chromaticity diagrams illustrated in FIGS. 19 and 20, and on the assumption that the light path switch disk is formed such that the first reflective-transmissive area has a reflectance index of 99.8%, and a transmittance index of 0.2%.

When the wavelength λ of laser light BP is 380 nm and the first reflective-transmissive area 3a in the light path switch disk 3 has a reflectance index R of 99.8% and a transmittance index T of 0.2%, the color reproduction range presented in FIG. 20 is changed to a color reproduction range presented in FIG. 23.

From this case, it can be understood that a 0.1% change of the reflectance index makes the chromaticity of blue component B changed largely.

Figure 24:
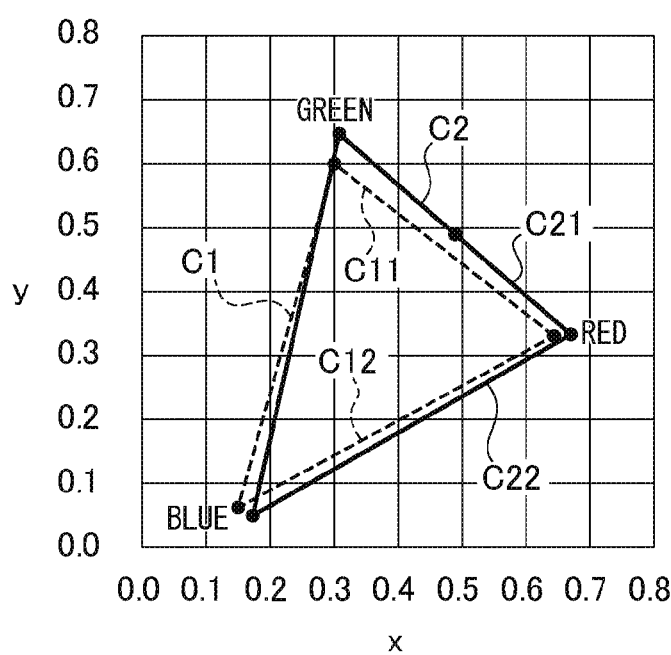
FIG. 24 is a diagram for explaining Specific Example 2 of a color reproduction range of the optical system illustrated in FIG. 1 with respect to a change in the wavelength of laser light, and is a chromaticity diagram of a color reproduction range under the conditions where laser light with a wavelength of 440 nm is used and the lighting efficiencies are set to be the same as those for obtaining the chromaticity diagram illustrated in FIG. 23, but on the assumption that the light path switch disk is formed such that the first reflective-transmissive area has a reflectance index of 91% and a transmittance index of 9%.

In contrast, when the wavelength λ of laser light BP is 440 nm and the first reflective-transmissive area 3a in the light path switch disk 3 has a reflectance index R of 91% and a transmittance index T of 9%, the color reproduction range presented in FIG. 21 is changed to a color reproduction range presented in FIG. 24.

As is apparent from the comparison between FIG. 21 and FIG. 24, it can be understood that the laser light BP with a wavelength λ of 440 nm makes the chromaticity of blue component B hardly changed even if the reflectance index R of the first reflective-transmissive area 3a of the light path switch disk 3 is changed by 1%.

Figure 25A:
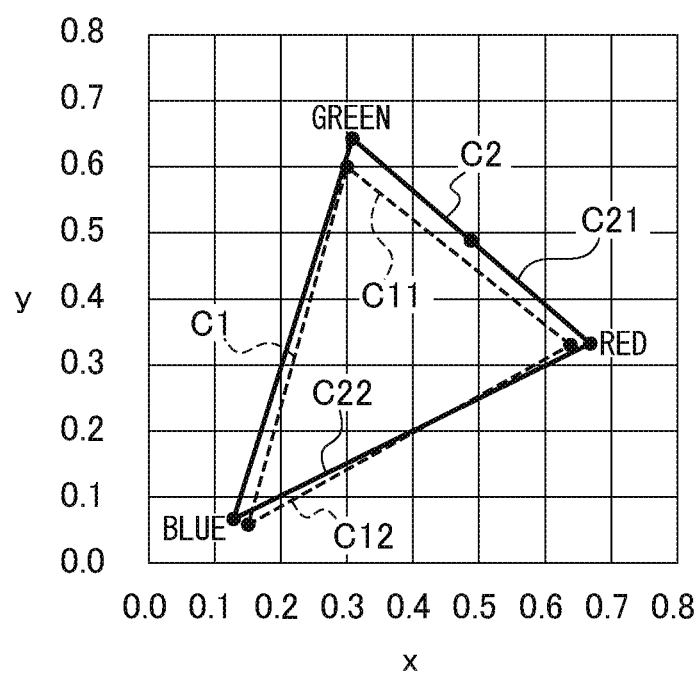
FIG. 25A is a diagram for explaining Specific Example 2 of a color reproduction range of the optical system illustrated in FIG. 1 with respect to a change in the wavelength of laser light, and is a chromaticity diagram of a color reproduction range under the conditions where laser light with a wavelength of 470 nm is used and the lighting efficiencies are set to be the same as those for obtaining the chromaticity diagram illustrated in FIG. 24, but on the assumption that the light path switch disk is formed such that the first reflective-transmissive area has a reflectance index of 98% and a transmittance index of 2%.

Then, when the wavelength λ of laser light BP is 470 nm and the first reflective-transmissive area 3a in the light path switch disk 3 has a reflectance index R of 98% and a transmittance index T of 2%, the color reproduction range presented in FIG. 22 is changed to a color reproduction range presented in FIG. 25A.

Also in this case, as is apparent from the comparison between FIG. 22 and FIG. 25A, it can be understood that the laser light BP with a wavelength λ of 470 nm makes the chromaticity of blue component B hardly changed even if the reflectance index R of the first reflective-transmissive area 3a of the light path switch disk 3 is changed by 1%.

In summary, when the wavelength λ of laser light BP is set to 440 nm<λ<470 nm, color adjustment can be performed such that the color reproduction range can be approximated to the international standard. Moreover, since the chromaticity changes to only a small degree relative to a change in the reflectance index R and the transmittance index T of the first reflective-transmissive area 3a in the light path switch disk 3 (the sensitivity of a chromaticity change with respect to the change in the reflectance index R and the transmittance index T is low), chromaticity variations can be suppressed even if quite large tolerances are set for the reflectance index R and the transmittance index T.

Specific Example 2 has been described for the case where the blue component B is color-mixed with the green component G, but the blue component B may be color-mixed with another color component.

Also in this case, the chromaticity of the blue component B can be adjusted on a line connecting the pure color of the blue component B and the pure color of the color component extracted by the color component switch disk 20 from the yellow component Y as the fluorescence component.

Specific Example 3

Specific Example 3 is described herein for the case where only the blue component B is color-mixed to improve its visual sensitivity, while no color mixture is performed on the red component R, the green component G, and the yellow component Y whose visual sensitivities (lm/W) are lowered with color mixture as presented in FIG. 18.

Figure 25B:
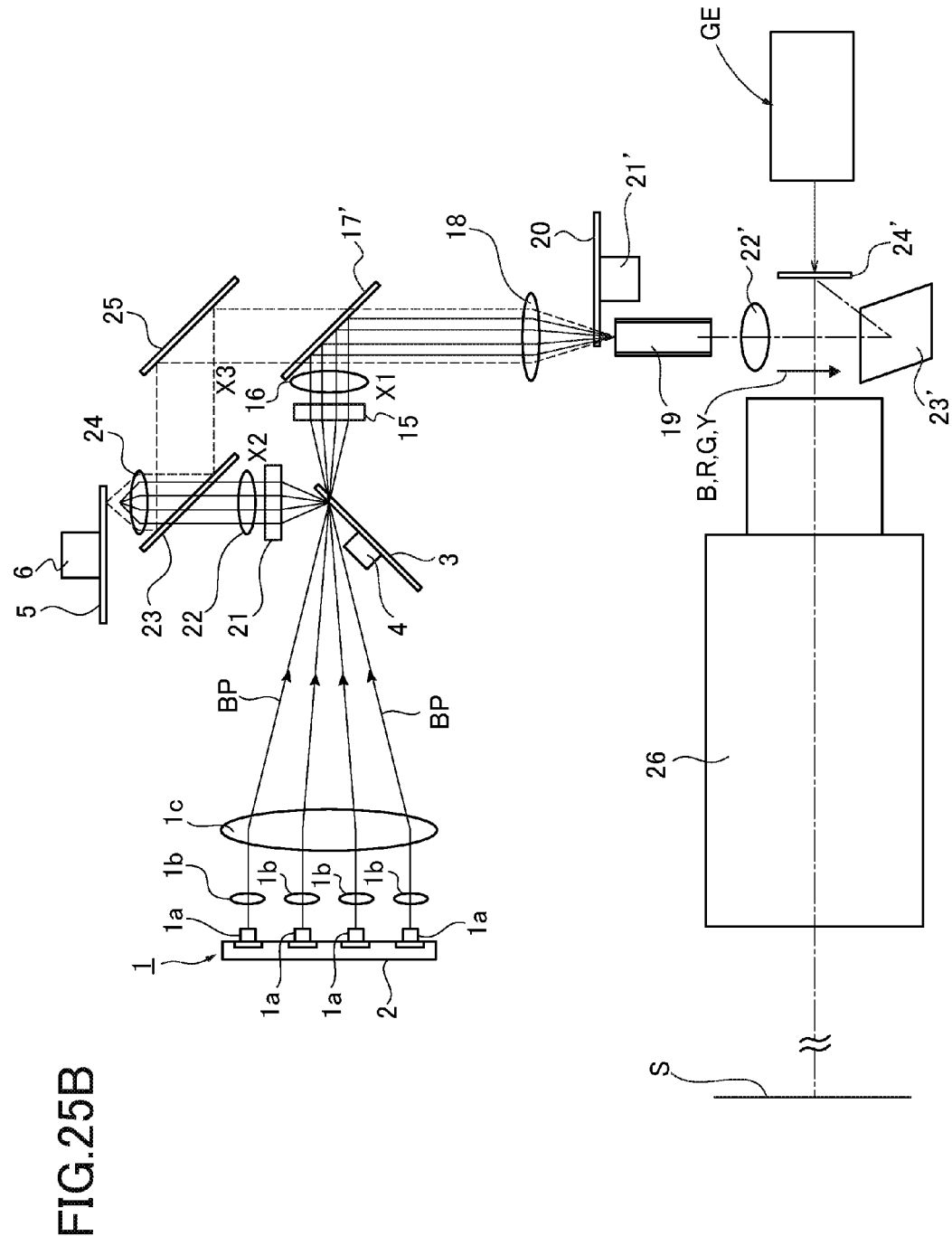
FIG. 25B is an explanatory diagram of an optical system used for explanation of Specific Example 3.

An example of an optical system used in Specific Example 3 is described by referring to FIG. 25B.

In the optical system illustrated in FIG. 25B, the same optical constituents as the optical constituents in FIG. 1 are indicated by the same reference numerals, and the detailed description thereof is omitted if not necessary.

In Specific Example 3, a light path switch disk 3 includes a first reflective-transmissive area 3a and a second reflective-transmissive area 3b as in Embodiment 1.

The first reflective-transmissive area 3a is formed of a transparent body having a reflectance index R of 5% and a transmittance index T of 95%, for example, and the second reflective-transmissive area 3b is formed of anti-transmission means (for example, a metal disk) having a reflectance index R of about 100%.

The angle range of the rotation angle θ of the first reflective-transmissive area 3a is 90 degrees, and the angle range of the rotation angle θ of the second reflective-transmissive area 3b is 270 degrees. A dichroic mirror 23 having optical characteristics of transmitting laser light BP of blue component B and reflecting fluorescence of green component G and fluorescence of red component R is disposed between a condensing lens 22 and a condensing lens 24.

A dichroic mirror 17' has optical characteristics of reflecting all the laser light BP collimated by a condensing lens 16, and transmitting the fluorescence of red component R and the fluorescence of green component G reflected by a total reflecting mirror 25, and functions as a light path merger unit.

The total reflecting mirror 25 is disposed in a light path between the dichroic mirror 23 and the dichroic mirror 17'. Moreover, as the color component switch disk 20, used is a disk configured as illustrated in FIG. 3 as in Embodiment 1.

The wavelength λ of laser light BP of the optical system illustrated in FIG. 25B is 465 nm. The red component R, the green component G and the yellow component Y have spectra SP illustrated in FIG. 14A to FIG. 14C, respectively.

The lighting efficiencies of the optical system illustrated in FIG. 25B are set at 32% for the light of red component R, green component G and blue component B and at 80% for the light of yellow component Y.

According to Specific Example 3, the second reflective-transmissive area 3b is configured not to transmit light of blue component B from a light source unit 1 therethrough to a light path X1, and thereby prevents illumination light of red component R, green component G, and yellow component Y from being color-mixed with the blue component B. In this way, the visual sensitivities of light of these components R, G, and Y can be lowering.

Incidentally, the second reflective-transmissive area 3b may be coated with a reflective coating in order to improve the lighting efficiencies of illumination light of red component R, illumination light of green component G and illumination light of yellow component Y In Specific Example 3, the second reflective-transmissive area 3b is made of the metal disk. Instead, the second reflective-transmissive area 3b may be formed in such a way that: the light path switch disk 3 is made of a glass disk as a transmissive member; a dielectric multilayer is formed on a surface of the glass disk on a side closer to the laser diodes 1a; and a black coating is applied to the back surface of the glass disk.

According to Specific Example 3, illumination light of blue component B is color-mixed with light of yellow component Y to improve the visual sensitivity lm/W of the illumination light of blue component B, while illumination light of red component R, illumination light of green component G, and illumination light of yellow component Y are not subjected to color mixture to prevent lowering of the visual sensitivities lm/W of these color components R, G, and Y.

Specific Example 4

Specific Example 4 uses the optical system illustrated in FIG. 13. The lighting efficiencies of the optical system illustrated in FIG. 13 are set at 32% for the light of red component R, green component G, and blue component B and at 80% for the light of yellow component Y.

The angle range of the first reflective-transmissive area 3a is 90 degrees, and the angle range of the second reflective-transmissive area 3b is 270 degrees.

In the color component switch disk 20, the angle range of each of the transmissive areas 20B, 20R, 20G and 20Y is 90 degrees (see FIG. 3).

Figure 26:
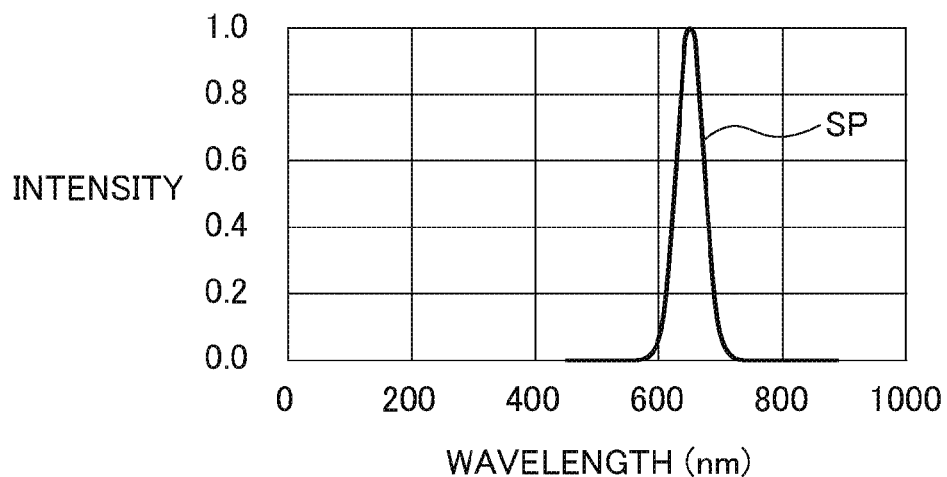
FIG. 26 is a diagram for explaining Specific Example 4 by using the optical system illustrated in FIG. 13, and is a characteristic chart illustrating an intensity distribution of a spectrum of red light illustrated in FIG. 13.

In Specific Example 4, an LED to emit red light is used as the light source 30. The intensity distribution of the spectrum SP of this light source 30 has a peak around a wavelength λ of 680 nm, for example, as illustrated in FIG. 26.

During a period when illumination light of red component R is projected, the laser diodes 1a are turned off.

Figure 27:
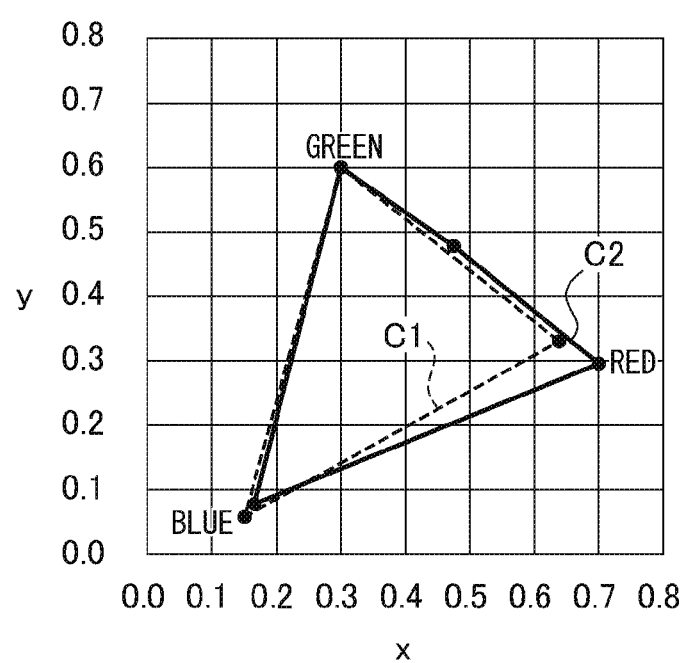
FIG. 27 is a chromaticity diagram for explaining a color reproduction range of Specific Example 4 using the optical system illustrated in FIG. 13.

With this configuration, the light of the red component R from the light source 30 is not color-mixed with the light of the other color components B, G and Y, and therefore a wide color reproduction range can be obtained as illustrated in FIG. 27.

Although the laser diodes 1a are turned off during the period when the illumination light of red component R is projected in Specific Example 4, the color of the light of red component R may be adjusted in the following way. Specifically, the transmissive area 20R of the color component switch disk 20 illustrated in FIG. 3 is adjusted in its diffraction characteristics to transmit light of green component G and light of blue component B, and the light path switch disk 3 and the color component switch disk 20 are controlled to rotate synchronously with each other, so that the light of red component R is adjusted in color by being color-mixed with the light of yellow component Y or the light of blue component B.

Moreover, Specific Example 4 has been described for the case where the light source 30 emits the light of red component R, but a light source to emit light of green component G may be used as the light source 30.

REFERENCE NUMERAL LIST

1a Laser Diode (Excitation Light Source)
3 Light path Switch Disk (Light path Switch Member)
3a First Reflective-transmissive area
3b Second Reflective-transmissive area
5 Fluorescent Member
X1 Projection Light path
X2 Excitation Light path
X3 Fluorescence Light path
(Cross-Reference to Related Applications)

The present application is based on and claims priority from each of Japanese Patent Application Number 2013-228666, filed on Nov. 1, 2013 and Japanese Patent Application Number 2014-180924, filed on Sep. 5, 2014, the disclosure of which is hereby incorporated by reference herein in its entirety.

The invention claimed is:

1. A light source device comprising:
an excitation light source configured to emit irradiation light of a color component to be used as excitation light and projection light;
a fluorescent member disposed in an excitation light path and configured to generate fluorescence when being irradiated with the irradiation light, the fluorescence having a color component different from the color component of the irradiation light;
a light path merger unit configured to merge a fluorescence light path through which the fluorescence generated with irradiation of the irradiation light is delivered and a projection light path through which the irradiation light is delivered as the projection light; and
a single disk light path switch member that includes a first reflective-transmissive area and a second reflective-transmissive area formed sequentially on an optical path of the irradiation light by the rotation of the single disk, the light path switch member being configured to switch the irradiation light between the excitation light path and the projection light path,
wherein the first reflective-transmissive area reflects a part of the irradiation light and transmits another part of the irradiation light, simultaneously guides the reflected and transmitted light to both the excitation light path and the projection light path, and is configured to mix the fluorescence and the projection light,
wherein the first reflective-transmissive area has a predetermined reflectance index, and
wherein the second reflective-transmissive area reflects a part of the irradiation light with a reflectance index higher than the predetermined reflectance index and transmits another part of the irradiation light, simultaneously guides the reflected and transmitted light to both the excitation light path and the projection light path, and is configured to mix the fluorescence and the projection light.

2. The light source device according to claim 1, wherein the light path switch member further includes a reflective area that reflects the irradiation light without transmitting.

3. The light source device according to claim 1, wherein the light path switch member is formed of a single light path switch disk, and the fluorescent member is formed of a rotary disk.

4. The light source device according to claim 1, wherein the fluorescent member is provided with a fluorescent material that generates fluorescence having at least two color components from the excitation light.

5. The light source device according to claim 4, wherein the color component of the irradiation light is any of a red component, a green component and a blue component, and
the two color components for the fluorescent member are any remaining two of the red component, the green component and the blue component other than the color component of the irradiation light.

6. The light source device according to claim 4, further comprising a color component switch member configured to deliver florescence to an image formation unit while switching fluorescence having one of the two color components, fluorescence having the other one of the two color components, and fluorescence having the two color components from one to another at regular intervals.

7. The light source device according to claim 6, wherein the color component switch member is unified with the light path switch disk.

8. The light source device according to claim 1, further comprising:
an irradiation light source configured to emit irradiation light of a color component different from the color component of the irradiation light emitted by the excitation light source; and
a light path merger member configured to merge the projection light path of the irradiation light from the excitation light source and an irradiation light path of the irradiation light from the irradiation light source.

9. The light source device according to claim 1, wherein the fluorescent member is provided with a fluorescent material formed to generate fluorescence of a color component which is different from the color component of the irradiation light emitted from the excitation light source and the color component of the irradiation light source.

10. The light source device according to claim 4, wherein the fluorescent member is provided with a first fluorescent area formed to generate fluorescence containing at least two color components from the excitation light, and a second fluorescent area including one color of fluorescence containing the at least two color components.

11. The light source device according to claim 1, wherein the light source device is capable of projecting projection light of a blue component, projection light of a red component, projection light of a green component, and projection light of a yellow component with a configuration in which
the excitation light source is a light source to emit laser light of the blue component,
the fluorescent member is coated with a fluorescent material of the yellow component containing fluorescence of the green component and fluorescence of the red component,
the first reflective-transmissive area of the light path switch member delivers part of irradiation light of the blue component to the projection light path and delivers the rest of the irradiation light to the excitation light path, and
the second reflective-transmissive area of the light path switch member delivers part of the irradiation light of the blue component to the excitation light path and delivers the rest of the irradiation light to the projection light path.

12. The light source device according to claim 11, wherein the second reflective-transmissive area of the light path switch member is divided into an area that reflects the laser light of the blue component and transmits fluorescence of the red component, an area that reflects the laser light of the blue component and transmits fluorescence of the green component, and an area that reflects the laser light of the blue component and transmits fluorescence of the yellow component.

13. The light source device according to claim 11, wherein the fluorescent member is provided with a fluorescent area formed to generate fluorescence of the yellow component and a fluorescent area formed to generate fluorescence of the green component.

14. The light source device according to claim 1,
wherein the excitation light has a wavelength in a range of 440 nm to 470 nm.

15. The light source device according to claim 1,
wherein the second reflective-transmissive area of the light path switch member has a reflectance rate R of $0\% < R \leq 5\%$.

16. The light source device according to claim 1,
wherein the first reflective-transmissive area of the light path switch member has a transmittance rate T of $0\% < T \leq 5\%$.

* * * * *